(12) United States Patent
Wang

(10) Patent No.: US 12,713,457 B2
(45) Date of Patent: Aug. 18, 2026

(54) HANDLING OF DIRECTIONAL UL LBT FAILURES

(71) Applicant: Telefonaktiebolaget LM Ericsson (publ), Stockholm (SE)

(72) Inventor: Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 431 days.

(21) Appl. No.: 17/779,454

(22) PCT Filed: Nov. 24, 2020

(86) PCT No.: PCT/EP2020/083232
§ 371 (c)(1),
(2) Date: May 24, 2022

(87) PCT Pub. No.: WO2021/151543
PCT Pub. Date: Aug. 5, 2021

(65) Prior Publication Data

US 2023/0009559 A1 Jan. 12, 2023

Related U.S. Application Data

(60) Provisional application No. 62/967,324, filed on Jan. 29, 2020.

(51) Int. Cl.
*H04W 74/0808* (2024.01)
*H04B 7/06* (2006.01)
(Continued)

(52) U.S. Cl.
CPC .... *H04W 74/0808* (2013.01); *H04B 7/06964* (2023.05); *H04L 5/0051* (2013.01); *H04W 24/04* (2013.01); *H04W 24/10* (2013.01)

(58) Field of Classification Search
CPC ......... H04W 74/0808; H04W 74/0816; H04W 74/0825; H04W 24/02; H04W 24/04;
(Continued)

(56) References Cited

U.S. PATENT DOCUMENTS

2020/0045684 A1* 2/2020 Futaki .................. H04B 7/0408
2022/0400396 A1* 12/2022 Alfarhan ........... H04W 74/0808
2023/0007554 A1* 1/2023 Turtinen ............... H04L 1/1883

FOREIGN PATENT DOCUMENTS

WO 2019191960 A1 10/2019

OTHER PUBLICATIONS

Nokia, et al., "Feature Lead's Summary #2 on Channel Access Procedures", 3GPP TSG RAN WG1 Meeting #98bis, Chongqing, P.R. China, Oct. 14, 2019, pp. 1-27, R1-1911706, 3GPP.

(Continued)

*Primary Examiner* — Peter Chen
(74) *Attorney, Agent, or Firm* — COATS & BENNETT, PLLC

(57) ABSTRACT

A wireless device (10) sends LBT (listen before talk) based uplink wireless transmissions on a serving transmission beam (22) to an access node (100-1, 100-2). The serving transmission beam (22) is selected from a plurality of transmission beams (21, 22, 23). Further, the wireless device (10) detects LBT failures on the serving transmission beam (22). Based on the number of the detected LBT failures on the serving transmission beam (22), the wireless device (10) sends a failure report to the access node (100-1, 100-2. The failure report indicates the detected LBT failures on the sewing transmission beam (22).

20 Claims, 10 Drawing Sheets

(51) Int. Cl.
*H04L 5/00* (2006.01)
*H04W 24/04* (2009.01)
*H04W 24/10* (2009.01)

(58) Field of Classification Search
CPC ..... H04W 24/08; H04W 24/10; H04W 72/21; H04W 36/305; H04L 5/0048; H04L 5/005; H04L 5/0051; H04L 5/0053; H04B 7/0695; H04B 7/06952; H04B 7/06964; H04B 7/088
See application file for complete search history.

(56) References Cited

OTHER PUBLICATIONS

Spreadtrum Communications, "Discussion on multi-beam operation", 3GPP TSG RAN WG1 #99, Reno, US, 2019-11-18, pp. 1-6, R1-1912563, 3GPP.
CMCC, "Discussion on BFR procedure in NR-U", Discussion on BFR procedure in NR-U, Athens, Greece, Feb. 25, 2019, pp. 1-3, R2-1901971, 3GPP.
Samsung, "Further Discussion on RRM Requirement for SCell Beam Failure Recovery", 3GPP TSG-RAN WG4 Meeting #93, Reno, NV, US, Nov. 18, 2019, pp. 1-8, R4-1913324, 3GPP.
Google, "Consistent LBT failure detection", 3GPP TSG-RAN WG2 Meeting#107bis, Chongqing, China, Oct. 14, 2019, pp. 1-6, R2-1913479, 3GPP.
3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 15)", Technical Specification, 3GPP TS 36.300 V15.7.0, Sep. 1, 2019, pp. 1-347, 3GPP, France.
3rd Generation Partnership Project, "3rd Generation Partnership Project; Technical Specification Group Radio Access Network; Study on NR-based access to unlicensed spectrum (Release 16)", Technical Report, 3GPP TR 38.889 V16.0.0, Dec. 1, 2018, pp. 1-119, 3GPP, France.
Intel Corporation, "New SID: Study on supporting NR from 52.6GHz to 71 Ghz", 3GPP TSG RAN Meeting #86, Sitges, Spain, Dec. 9, 2019, pp. 1-3, RP-193259, 3GPP.
3rd Generation Partnership Project, "3rd Generation Partnership Project; Technical Specification Group Radio Access Network; NR; Medium Access Control (MAC) protocol specification (Release 15)", Technical Specification, 3GPP TS 38.321 V15.7.0, Sep. 1, 2019, pp. 1-78, 3GPP, France.
3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 15)", Technical Specification, 3GPP TS 36.300 V15.8.0, Dec. 2, 2019, pp. 1-347, 3GPP, France.
3rd Generation Partnership Project, "3rd Generation Partnership Project; Technical Specification Group Radio Access Network; NR; Medium Access Control (MAC) protocol specification (Release 15)", Technical Specification, 3GPP TS 38.321 V15.8.0, Dec. 1, 2019, pp. 1-78, 3GPP, France.
Ericsson, "Handling consistent UL LBT failures", 3GPP TSG-RAN WG2 Meeting #108, Reno, U.S., Nov. 18, 2019, pp. 1-25, Tdoc R2-1915870, 3GPP.

* cited by examiner

HANDLING OF DIRECTIONAL UL LBT FAILURES

TECHNICAL FIELD

The solution presented herein relates to methods for controlling wireless transmissions and to corresponding devices, systems, and computer programs.

BACKGROUND

There is an ongoing need for improved wireless communication technologies. For example, a 5$^{th}$ generation (5G) cellular technology, referred to as New Radio (NR), is being developed by 3GPP (3$^{rd}$ Generation Partnership Project). The NR technology is designed with the aim of high flexibility to support multiple and substantially different use cases. Besides the typical mobile broadband use case, use cases being considered include but are not limited to machine type communication (MTC), ultra-low latency critical communications (URLCC), and side-link device-to-device (D2D).

In NR, the basic scheduling unit in the time domain is called a slot. A slot has 14 OFDM (Orthogonal Frequency Division Multiplexing) symbols for a normal cyclic prefix configuration. The NR technology supports many different subcarrier spacing configurations. For example, at a subcarrier spacing of 30 kHz, the OFDM symbol duration is about 33 μs. As an example, a slot with 14 symbols for the same subcarrier-spacing (SCS) is 500 μs long (including cyclic prefixes).

The NR technology also supports flexible bandwidth configurations for different user equipments (UEs) in the same serving cell. In other words, the bandwidth monitored by a UE and used for its control and data channels may be smaller than the carrier bandwidth. One or multiple bandwidth part (BWP) configurations for each component carrier can be semi-statically signaled to a UE, where a BWP has a group of contiguous PRBs (Physical Resource Blocks), and reserved resources can be configured within the BWP. The bandwidth of a BWP equals to or is smaller than the maximum bandwidth capability supported by a UE. More generally, the BWP may thus be considered as being a part or subrange of the maximum supported bandwidth of a UE.

NR targets both licensed and unlicensed bands. The utilization of the NR technology in unlicensed bands, also referred to as NR-U, is, for example, discussed in 3GPP TR 38.889 V16.0.0 (2018-12). Allowing unlicensed networks, i.e., networks that operate in shared spectrum (or unlicensed spectrum) to effectively use the available spectrum is an attractive approach to increase system capacity. Although an unlicensed spectrum typically does not match the qualities of a licensed spectrum, solutions that allow an efficient utilization of an unlicensed spectrum, e.g., as a complement to licensed deployments, may provide significant value network operators and users. It can be expected that some features of the NR technology may need adaptation to comply with the special characteristics of usage in an unlicensed spectrum as well as various regulations for unlicensed spectra. Subcarrier spacings of 15 or 30 kHz have been identified as promising candidates for NR-U in frequency ranges below 6 GHz.

When operating in an unlicensed spectrum, many regions in the world require a device to sense the medium as free before transmitting. This kind of operation is often referred to as "listen before talk" (LBT). There are many different variations of LBT, depending on which radio technology the device uses and which type of data it wants to transmit at the moment. Common to all variations is that the sensing is done in a particular channel, corresponding to a defined carrier frequency, and over a predefined bandwidth. For example, in the 5 GHz band, the sensing may be done over 20 MHz channels.

Many devices are capable of transmitting and/or receiving over a wide bandwidth including multiple sub-bands or channels. Here, an LBT sub-band may be considered as the part of the bandwidth to which sensing is applied in an LBT procedure. Typically, a device is only allowed to transmit on the LBT sub-bands where the medium is sensed as free in the LBT procedure. Again, there are different variations of how the sensing may be done when multiple LBT sub-bands are involved.

In principle, there are two ways a device can operate over multiple LBT sub-bands. In one option, the transmitter/receiver bandwidth is changed depending on which LBT sub-bands were sensed as free. In this setup, there may, for example, be only one component carrier (CC), where the multiple LBT sub-bands are treated as a single channel with a larger bandwidth. In another option, the device operates almost independent processing chains for each LBT sub-band. Depending on how independent the processing chains are, this option can be referred to as carrier aggregation (CA) or dual connectivity (DC) utilization of the LBT sub-bands.

For NR-U, the utilized LBT mechanism is designed for co-existence with other RATs (Radio Access Technologies) in the unlicensed spectrum. In this LBT mechanism, a radio device applies a Clear Channel Assessment (CCA) check, where the radio device performs channel sensing before attempting a transmission. The LBT mechanism involves Energy Detection (ED) on the channel over a time period, and comparison of the detected energy to a certain threshold (e.g., ED threshold), in order to determine whether the channel is idle or occupied. If the channel is determined to be occupied, the transmitter performs a random back-off within a contention window before the next CCA attempt. In order to protect ACK (acknowledgement) transmissions, the transmitter defers for a certain period after each busy CCA slot prior to resuming back-off. As soon as the transmitter has gained access to the channel, the transmitter is allowed to transmit for up to a maximum time duration, which is defined by a Maximum Channel Occupancy Time (MCOT). For Quality of Service (QoS) differentiation, a channel access priority based on the service type may be utilized. For example, four LBT priority classes are defined for differentiation of Contention Window Sizes (CWS) and MCOT between services.

Prior to any transmission in the uplink, the UE may need to perform the LBT operation to gain access to the channel. For instance, when the MAC (Medium Access Control) layer initiates a transmission, the MAC layer requests the PHY (physical) layer to initiate the LBT operation, and the PHY layer sends an indicator to the MAC, which indicates the outcome of the LBT procedure. If the UE gains access to the channel, the PHY layer indicates an LBT success; if the channel was sensed to be occupied, the PHY layer indicates an LBT failure.

In existing radio technologies, such as LTE (Long Term Evolution) specified by 3GPP or the NR technology, there are also mechanisms for handling radio link failures. For example, LTE provides a Radio Link Failure (RLF) recovery procedure to assist the UE to quickly and reliably recover from an RLF, without transitioning through an RRC (Radio Resource Control) idle state. In this way, latency due to performing a Random Access (RA) procedure and an RRC connection establishment procedure can be avoided. The RLF handling in LTE is, for example, specified in 3GPP TS 36.300 V15.8.0 (2019-12), section 10.1.6. FIG. 1 shows an example of an RLF recovery process in LTE. The process of FIG. 1 involves radio link monitoring of a serving cell followed by an RRC re-establishment in a target cell.

Several situations may lead to RLF in LTE, including but not limited to:

A. Timer T310 expiry: While the UE is in RRC connected mode, the UE monitors the downlink (DL) radio channel quality based on DL reference symbols. The UE compares the measured DL channel quality with out-of-sync and in-sync thresholds, referred to as $Q_{out}$ and $Q_{in}$, respectively. The PHY layer evaluates the DL channel quality and periodically sends an indication on out-of-sync or in-sync to UE layer 3. Based on the in-sync and out-of-sync indications, the UE layer 3 then evaluates if there is an RLF. For example, if the number of consecutively received out-of-sync indications exceeds a counter N310, a timer T310 is started. While the timer T310 is running, the radio link is considered to be recovered if the UE consecutively receives N311 in-sync indications from the PHY layer. If the timer T310 expires, the UE declares an RLF.

B. The UE reaches a maximum number of RLC retransmissions in the uplink (UL).

C. Handover failure and timer T304 expiry: During a handover procedure, a timer T304 is started when the UE receives a handover command from the source cell. The value of the timer T304 is set to allow the UE to try the maximum RA attempts to the target cell. If the timer T304 expires, the UE detects an RLF due to handover failure.

Upon detection of an RLF, a radio connection re-establishment process is triggered. A UE first performs cell search to determine the best cell for radio link re-establishment. According to 3GPP TS 36.300 V15.8.0, a UE can select the same cell, a different cell from the same access node (referred to as "eNB" in LTE), or a prepared cell from a different eNB, where the activity can be resumed (i.e., the UE stays in connected mode) via radio connection re-establishment procedure because the previous UE context can be retrieved by inter-cell communication. However, when a prepared cell is not available, the UE selects an unprepared cell. In this case, the UE has to go to idle mode and try to setup the radio connection afterwards. In this case, activity of the UE cannot be resumed. Table 10.1.6-1 from 3GPP TS 36.300 V15.8.0 guides the UE behavior for target cell selection.

In NR, which supports beamformed transmission, beam failures may also occur. Accordingly, the NR technology also provides a mechanism and procedures for Beam Failure Recovery (BFR) to enable quick recovery from such beam failures. Beam failure can happen for different reasons, e.g., sudden blocking of a DL beam or inefficient beam management procedures. The BFR procedure of the NR technology is, for example, specified in 3GPP TS 38.300 V15.8.0 (2019-12), section 9.2.8.

The BFR procedure in NR includes several steps:

1. A first step involves Beam Failure Detection (BFD). BFD is implemented on the PHY layer (L1), based on detecting that BLER (Block Error Rate) of a (hypothetical) PDCCH is above a threshold for a certain time.
2. In a second step, new candidate beams are identified by measuring beam identification Reference Symbols (RSs), e.g., CSI-RS (Channel State Information Reference Symbols) that are above a threshold with respect to L1-RSRP on the CSI-RS.
3. In a third step, the MAC layer (L2) is provided with the set of candidate beams and a BFR is triggered, which will initiate an RA procedure. Typically, this will trigger a CFRA (Contention Free Random Access), where the UE uses a dedicated preamble transmitted on PRACH (Physical Random Access Channel) resources that are dedicated to BFR, and indicates which beam is selected. These PRACH resources are not dedicated to a specific UE, but rather are common to all UEs who do CFRA for BFR, which is similar to PRACH resources dedicated to different SSBs (Synchronization Signal Blocks) for initial access. Hence, by the dedicated preamble and dedicated PRACH resource, the access node, which is referred to as "gNB" in NR, can conclude which UE transmitted the preamble, the reason for the transmission, and which new serving beam it indicates. If the UE has no dedicated preamble for BFR, CBRA (Contention Based Random Access) may be used instead.
4. In a fourth step, the gNB transmits a response to the BFR on the PDCCH (Physical DL Control Channel) addressed to the UEs C-RNTI (Cell Radio Network Temporary Identifier). Handling of the BFR by the MAC layer is, for example, specified in 3GPP TS 38.321 V15.8.0 (2019-12), section 5.17.

A mechanism for handling consistent UL LBT failures is also being considered for NR-U. Possible characteristics of such mechanism are, for example, described in 3GPP meeting contribution "Handling consistent UL LBT failures", 3GPP TSG-RAN WG2 Meeting #108, Tdoc R2-1915870, Reno, U.S., 18-22 Nov. 2019. In this mechanism, the MAC entity may be configured by RRC with a consistent LBT failure recovery procedure. Consistent LBT failure is detected per UL BWP by counting LBT failure indications, for all UL transmissions, from the lower layers to the MAC entity.

In particular, the RRC configures the following parameters in the Ibt-FailureRecoveryConfig:

Ibt-FailureInstanceMaxCount for the consistent LBT failure detection; and

Ibt-FailureDetectionTimer for the consistent LBT failure detection.

The following UE variable is used for the consistent LBT failure detection procedure:

LBT_COUNTER: counter for LBT failure indication, which is initially set to 0.

The following describes an exemplary simplified MAC procedure for an activated Serving Cell configured with Ibt-FailureRecoveryConFigure The detailed procedure would be different depending on whether consistent UL LBT failures are detected in the primary cell (PCell or PSCell) or in an SCell.

1> if LBT failure indication has been received from lower layers:
  2> start or restart the Ibt-FailureDetectionTimer;
  2> increment LBT_COUNTER by 1;
  2> if LBT_COUNTER>=Ibt-FailureInstanceMaxCount:
    3> declare consistent LBT failures for the active UL BWP;
1> if the Ibt-FailureDetectionTimer expires; or
1> if Ibt-FailureDetectionTimer or Ibt-FailureInstanceMaxCount is reconfigured by upper layers:
  2> set LBT_COUNTER to 0.

A UE may be configured with several BWPs. UL LBT failure handling may be operated per BWP. The UE maintains a timer and a counter for every BWP. Whenever the UE switches to a different BWP, the UE uses the timer and the counter in the new active BWP for detection of UL LBT failures. At the same time, the UE resets the timer and the counter in the de-activated BWP. If the active BWP comprises several LBT subbands, it is enough for the UE to keep a common counter across LBT subbands with the same BWP. In other words, an UL LBT problem is only declared in case the number of LBT failures from all LBT subbands has reached a predefined counter.

If a UE experiences LBT problems in its current active BWP, it is beneficial for the UE to switch to another BWP prior to triggering an RLF. The UE initiates an RA on an inactive BWP that has PRACH resource configured. Upon reception of the RA, the gNB can decide if the UE needs to switch to another BWP. The gNB can reply with a DCI or an RRC reconfiguration indicating the new BWP, which may be different from the one in which the UE has transmitted the RA. After switching to the new active BWP, the UE resets the counter for LBT problem detection.

If the UE has detected LBT problems for all configured BWPs with RA configured, the UE may declare an RLF for the cell and trigger RRC connection reestablishment. In case an RLF event is triggered, the UE would follow the existing RRC connection reestablishment procedure to recover from the failure.

For a UE configured with SCells, if the UE has detected consistent UL LBT failures in an SCell, the UE informs the gNB of the occurrence of the LBT failures, so the gNB takes appropriate recovery actions, for example, to inactivate or de-configure the cell where the UL LBT failures have been detected. When consistent uplink LBT failures are detected on an SCell, a corresponding MAC CE (MAC Control Element) may be used to report these LBT failures to the node to which the SCell belongs. The MAC CE, e.g., named as UL LBT failure Indication MAC CE, can indicate the serving cell in which consistent UL LBT failures have been detected. The gNB knows in which BWP the UE is currently active. As a UE only has one active BWP per cell, the gNB can derive that the UE has experienced consistent UL LBT failures in its current active BWP in the indicated cell upon reception of the MAC CE. The MAC CE format may support multiple entries to indicate all the cells in which consistent UL LBT failures have been detected.

When consistent UL LBT failures are detected in a BWP of an SCell, the MAC entity will trigger a UL LBT failure Indication MAC CE. If there is an available UL grant in any serving cell for a new transmission, the UE will indicate to the Multiplexing and assembly entity to include a UL LBT failure Indication MAC CE in the subsequent uplink transmission. If there is no UL grant available, the UE triggers a scheduling request requesting new UL resources for the MAC CE.

The UL LBT failure Indication MAC CE may also be applied to the primary cell (PCell or PSCell). In the primary cell, the UE switches to another BWP and initiates RACH upon declaration of consistent LBT failures. During the RACH procedure, and especially for a CBRA based procedure, the UE can include the MAC CE (e.g., UL LBT failure Indication MAC CE) in a Msg3 so that the gNB can identify the reason why the RA has been triggered by the UE. When consistent uplink LBT failures are detected on the PSCell, the UE informs the MN (Master Node) via the SCG (Secondary Cell Group) failure information procedure after detecting consistent UL LBT failures on all configured BWPs.

As mentioned in 3GPP TR 38.889 V16.0.0, using directional LBT for beamformed transmissions, i.e., performing LBT in the direction of the transmitted beam is considered for NR-U. As compared to omni-directional LBT, directional LBT can lead to better channel access probability. As a result, better spatial reuse may be achieved. On the other hand, for NR-U in the sub-7 GHz frequency region, single beam operation is considered as being better suited for broadcast transmissions, such as SS (Synchronization Signals) or PBCH (Physical Broadcast Channel), than multi-beam operation, because beam sweeping operations can be avoided. In an unlicensed spectrum, the UE's radio output power is normally subject to restrictions. Accordingly, if a UE is able to reach maximum radio output power with an omni-directional transmission, a directional transmission with a high beamforming gain may not provide additional coverage. Currently, directional LBT is not supported for NR-U.

In NR-U, the above-mentioned consistent UL LBT failure handling mechanism would operate per BWP at the MAC layer. With this mechanism, the UE MAC layer would keep monitoring UL LBT failures for any UL transmission, without distinguishing the LBT failure handling between different types of UL transmissions, such as PRACH signaling, PUCCH signaling, PUSCH transmission, and SRS signaling. For a UE, if the consistent UL LBT failures reach the configured counter in its current active BWP, the UE would first attempt to switch to another inactive BWP. If the UE has discovered consistent UL LBT failures in its all configured BWPs, an RLF event would be triggered for the UE.

As, for example, explained in 3GPP meeting contribution "New SID: Study on supporting NR from 52.6 GHz to 71 GHz", 3GPP TSG RAN Meeting #86, Tdoc RP-193259, Sitges, Spain, Dec. 9-12, 2019, NR may be enhanced by supporting operation in frequency ranges above 52.6 GHz, up to 71 GHz, considering both licensed and unlicensed operation. In these frequency regions, utilization of directional LBT for NR-U may be beneficial. However, the existing consistent UL LBT failure handing mechanisms are designed for omni-directional LBT and may thus be insufficient for NR-U operation beyond the 52.6 GHz range in Rel-17.

Accordingly, there is a need for techniques that allow for efficiently controlling wireless transmissions in view of directional LBT failures.

SUMMARY

One exemplary embodiment provides a method of controlling wireless transmissions in a wireless communication system. According to the exemplary method, a wireless device sends LBT based uplink wireless transmissions on a serving transmission beam to an access node. The serving transmission beam is selected from a plurality of transmission beams. Further, the wireless device detects LBT failures on the serving transmission beam. Based on the number of the detected LBT failures on the serving transmission beam, the wireless device sends a failure report to the access node. The failure report indicates the detected LBT failures on the serving transmission beam.

One exemplary embodiment provides a method of controlling wireless transmissions in a wireless communication system. According to the exemplary method, an access node receives, on a serving transmission beam, LBT based uplink wireless transmissions from a wireless device. The serving transmission beam is selected from a plurality of transmission beams. Further, the access node receives a failure report from the wireless device. The failure report indicates detected LBT failures on the serving transmission beam. Based on the failure report, the access node controls switching of the wireless device to a new serving transmission beam.

One exemplary embodiment provides a wireless device for a wireless communication system. The wireless device is configured to send LBT based uplink wireless transmissions on a serving transmission beam to an access node. The serving transmission beam is selected from a plurality of transmission beams. The wireless device is further configured to detect LBT failures on the serving transmission beam. In addition, the wireless device is further configured to, based on the number of the detected LBT failures on the serving transmission beam, send a failure report to the access node. The failure report indicates the detected LBT failures on the serving transmission beam.

One exemplary embodiment provides a wireless device for a wireless communication system. The wireless device comprises at least one processor and a memory. The memory contains instructions executable by said at least one processor, whereby the wireless device is operative to send LBT based uplink wireless transmissions on a serving transmission beam to an access node. The serving transmission beam is selected from a plurality of transmission beams. Further, the memory contains instructions executable by said at least one processor, whereby the wireless device is operative to detect LBT failures on the serving transmission beam. Further, the memory contains instructions executable by said at least one processor, whereby the wireless device is operative to, based on the number of the detected LBT failures on the serving transmission beam, send a failure report to the access node. The failure report indicates the detected LBT failures on the serving transmission beam.

One exemplary embodiment provides an access node for a wireless communication system. The access node is configured to receive, on a serving transmission beam, LBT based uplink wireless transmissions from a wireless device. The serving transmission beam is selected from a plurality of transmission beams. The access node is further configured to receive a failure report from the wireless device. The failure report indicates detected LBT failures on the serving transmission beam. The access node is further configured to, based on the failure report, control switching of the wireless device to a new serving transmission beam.

One exemplary embodiment provides an access node for a wireless communication system. The access node comprises at least one processor and a memory. The memory contains instructions executable by said at least one processor, whereby the access node is operative to receive, on a serving transmission beam, LBT based uplink wireless transmissions from a wireless device. The serving transmission beam is selected from a plurality of transmission beams. Further, the memory contains instructions executable by said at least one processor, whereby the access node is operative to receive a failure report from the wireless device. The failure report indicates detected LBT failures on the serving transmission beam. Further, the memory contains instructions executable by said at least one processor, whereby the access node is operative to, based on the failure report, control switching of the wireless device to a new serving transmission beam.

One exemplary embodiment provides a computer program or computer program product, e.g., in the form of a non-transitory storage medium, which comprises program code to be executed by at least one processor of a wireless device of a wireless communication system. Execution of the program code causes the wireless device to send LBT based uplink wireless transmissions on a serving transmission beam to an access node. The serving transmission beam is selected from a plurality of transmission beams. Execution of the program code further causes the wireless device to detect LBT failures on the serving transmission beam. Execution of the program code further causes the wireless device to, based on the number of the detected LBT failures on the serving transmission beam, send a failure report to the access node. The failure report indicates the detected LBT failures on the serving transmission beam.

One exemplary embodiment provides a computer program or computer program product, e.g., in the form of a non-transitory storage medium, which comprises program code to be executed by at least one processor of an access node of a wireless communication system. Execution of the program code causes the access node to receive, on a serving transmission beam, LBT based uplink wireless transmissions from a wireless device. The serving transmission beam is selected from a plurality of transmission beams. Execution of the program code further causes the access node to receive a failure report from the wireless device. The failure report indicates detected LBT failures on the serving transmission beam. Execution of the program code further causes the access node to, based on the failure report, control switching of the wireless device to a new serving transmission beam.

Details of such embodiments and further embodiments will be apparent from the following detailed description of embodiments.

DETAILED DESCRIPTION

In the following, concepts in accordance with exemplary embodiments of the solution presented herein will be explained in more detail and with reference to the accompanying drawings. The illustrated embodiments relate to controlling of directional LBT based wireless transmissions in a wireless communication system. The wireless communication system may be based on the NR technology. In particular, the illustrated embodiments are explained by referring to various examples in the context of NR unlicensed operation, i.e., NR-U. However, it is noted that the illustrated concepts could also be applied in other unlicensed scenarios, such as LTE LAA (Licensed Assisted Access) or MulteFire. Further, the illustrated concepts could also be applied to licensed scenarios where a medium is shared between different access entities or different radio access technologies using an LBT based channel access mechanism. As used herein, UL (uplink) refers to a transmission direction from the wireless device to an access node of the wireless communication system, and DL (downlink) refers to a transmission direction from an access node of the wireless communication system to the wireless device.

In the illustrated concepts, beamforming is utilized for the LBT based uplink wireless transmissions. In particular, the LBT based UL wireless transmissions are performed on a serving transmission beam from a wireless device to an access node. The serving transmission beam is selected from a plurality of transmission beams. In the illustrated examples, the wireless device is assumed to be a UE, and the access node is assumed to be a gNB of the NR technology, though such is not required. In the following, the transmission beams may also be referred to as "beams". However, it is noted that depending on the underlying technology, the concepts could also be applied in connection with other types of wireless devices or access nodes. In order to enable the beamformed transmissions, the wireless device and the access node may each be equipped with multiple transmit and receive antennas. The beamforming mechanism in the UE and the access node may, for example, be based on an adaptive phased array beamforming technique or on a switched beam beamforming technique.

In the illustrated concepts, the wireless device detects LBT failures on the serving transmission beam. In the following, the transmission beams may also be referred to as "beams." As explained in more detail below, based on the number of the detected LBT failures on the serving transmission beam, the illustrated concepts involve the wireless device sending a failure report to the access node. The failure report indicates the detected LBT failures on the serving transmission beam. Accordingly, monitoring and reporting of the LBT failures may be accomplished on a per transmission beam basis.

Figure 1:
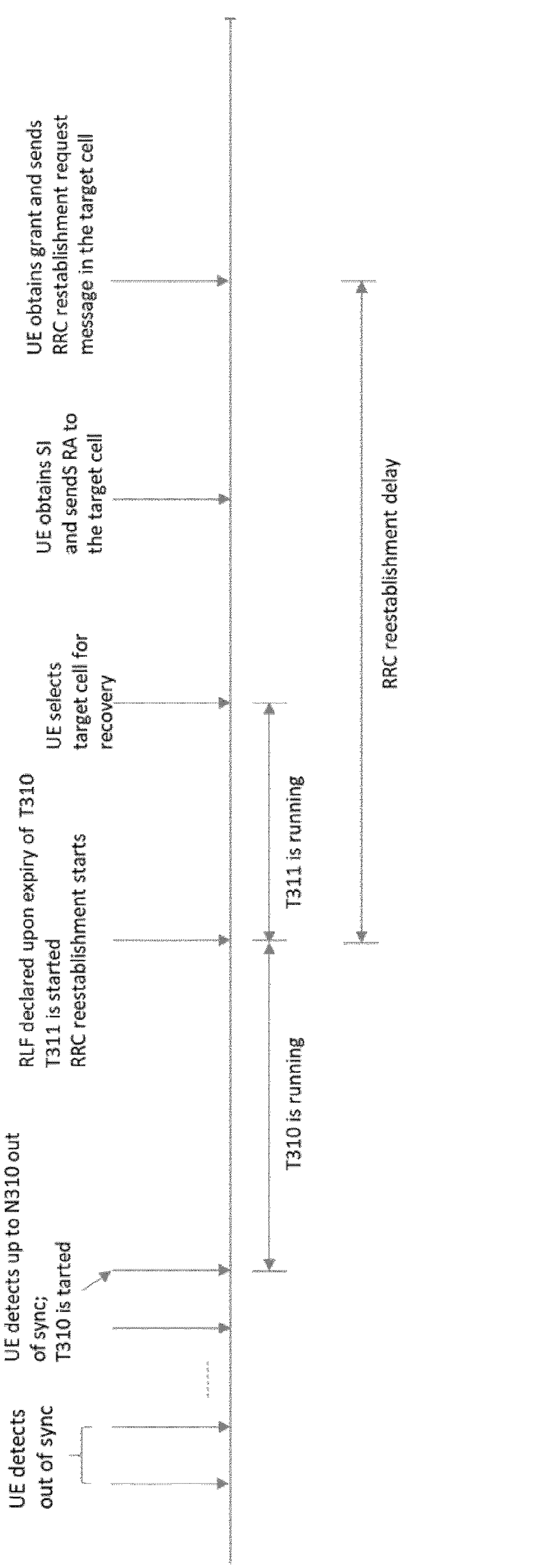
FIG. 1 schematically illustrates an exemplary RLF procedure in the LTE technology.
Figure 2:
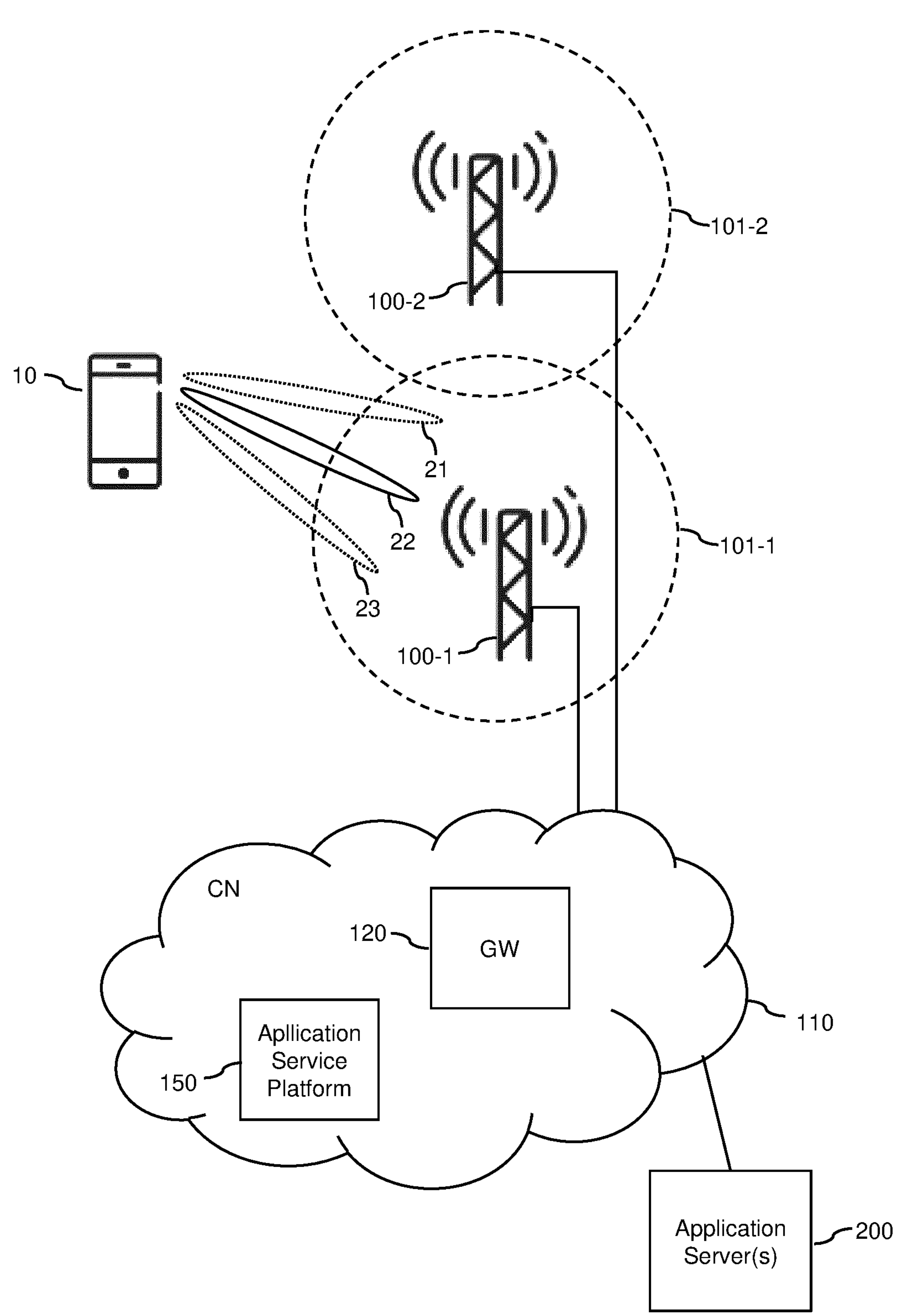
FIG. 2 schematically illustrates elements of a wireless communication system according to an embodiment.

FIG. 2 illustrates an exemplary wireless communication system according to an embodiment, where the wireless communication system includes access nodes 100-1 and 100-2, and respective serving cells 101-1 and 101-2. A UE 10 is connected through a radio link to access node 100-1. The radio link may be based on one or more carriers from an unlicensed spectrum, e.g., an unlicensed spectrum the frequency range from 52.6 GHz to 71 GHz. As illustrated, multiple beams 21, 22, 23 are available for transmissions between the UE 10 and the access node 100-1. In the illustrated example, it is assumed that beam 22 is actually utilized for the transmissions, i.e., is selected as the serving transmission beam. In other words, beam 22 is used for the radio link between UE 10 and access node 100-1.

The access nodes 100-1, 100-2 are part of a RAN (Radio Access Network) of the wireless communication network, which typically also includes further access nodes to provide a desired coverage of the wireless communication network. FIG. 2 also shows a core network (CN) 110 of the wireless communication network, which may provide connectivity of the UE 10 to other data networks, e.g., through a GW (Gateway) 120. Further, the CN 110 may also include various nodes for controlling operation of the UE 10.

The radio link to the wireless communication network may be used for providing various kinds of services to the UE 10, e.g., a voice service, a multimedia service, or other data service. Such services may be based on applications, which are executed on the UE 10 and/or on a device linked to the UE 10. Further, FIG. 2 illustrates an application service platform 150 in CN 110 of the wireless communication network. FIG. 2 also illustrates one or more application servers 200 provided outside the wireless communication network. The application(s) executed on the UE 10 and/or on one or more other devices linked to the UE 10 may use the radio links with one or more other UEs 10, the application service platform 150, and/or the application server(s) 200, thereby enabling the corresponding service(s) on the UE 10. In some scenarios, the services utilized by the UE 10 may thus be hosted on the network side, e.g., on the application service platform 150 or on the application server(s) 200. In the example of FIG. 2, the UE 10 is assumed to be a mobile phone or smartphone. However, it is noted that other types of UE could be used as well, e.g., an MTC device or vehicle-based device.

The UE 10 and the access node 100-1 implement a reporting mechanism that enables UE 10 to indicate consistent UL directional LBT failures on the serving beam 22 to the access node 100-1. Upon detection of the consistent LBT failures on the serving beam, the UE 10 may autonomously switch to a different beam to recover from the LBT failures. The consistent LBT failures may be indicated by a report message. The report message may be sent on a different beam than the serving beam on which the LBT failures were detected. Upon reception of the report message, access node 100-1 may instruct UE 10 to continue using the same beam the UE 10 autonomously switched to, or to utilize a different beam.

As compared to the existing UL LBT failure handling mechanisms of NR technology, the illustrated reporting mechanism involves implementing UL directional LBT failure handling on a per beam or per SSB basis. The illustrated reporting mechanism also allows that UE 10 autonomously changes to a different beam if consistent UL LBT failures occurred on the current serving beam. Further, the illustrated reporting mechanism allows UE 10 to report LBT failures per beam or SSB. The illustrated reporting mechanism may also trigger different recovery actions at different granularity levels depending on whether the LBT failures occur on a beam level, on an LBT sub-band level, on a BWP level, or on a cell level.

In some scenarios, an UL LBT failure handling mechanism may be provided that depends on whether omni-directional LBT or directional LBT is applied by the UE 10. Depending on whether omni-directional LBT or directional LBT is applied, the UL LBT failure handling mechanism operates differently.

If omni-directional LBT is applied, the UL LBT failure handling mechanism is maintained per BWP. The relevant timers and counters for UL LBT failure monitoring can then be maintained per BWP. If a consistent UL LBT failure is detected in a BWP, the UE 10 may autonomously switches to another BWP. If the UE 10 has detected consistent UL LBT failures in all configured BWPs, the UE 10 may further trigger an RLF event for the corresponding serving cell. In an RLF recovery procedure, the UE 10 may then re-connect to another cell.

If directional LBT is applied, the UL LBT failure handling mechanism is maintained per beam/SSB. The relevant timers and counters for UL LBT failure monitoring can then be maintained per beam/SSB. A consistent directional UL LBT failure (CDLF) event may be detected for a beam/SSB when the number of consecutive UL directional LBT failures reaches a predefined counter maintained for the beam/SSB.

Figure 3:
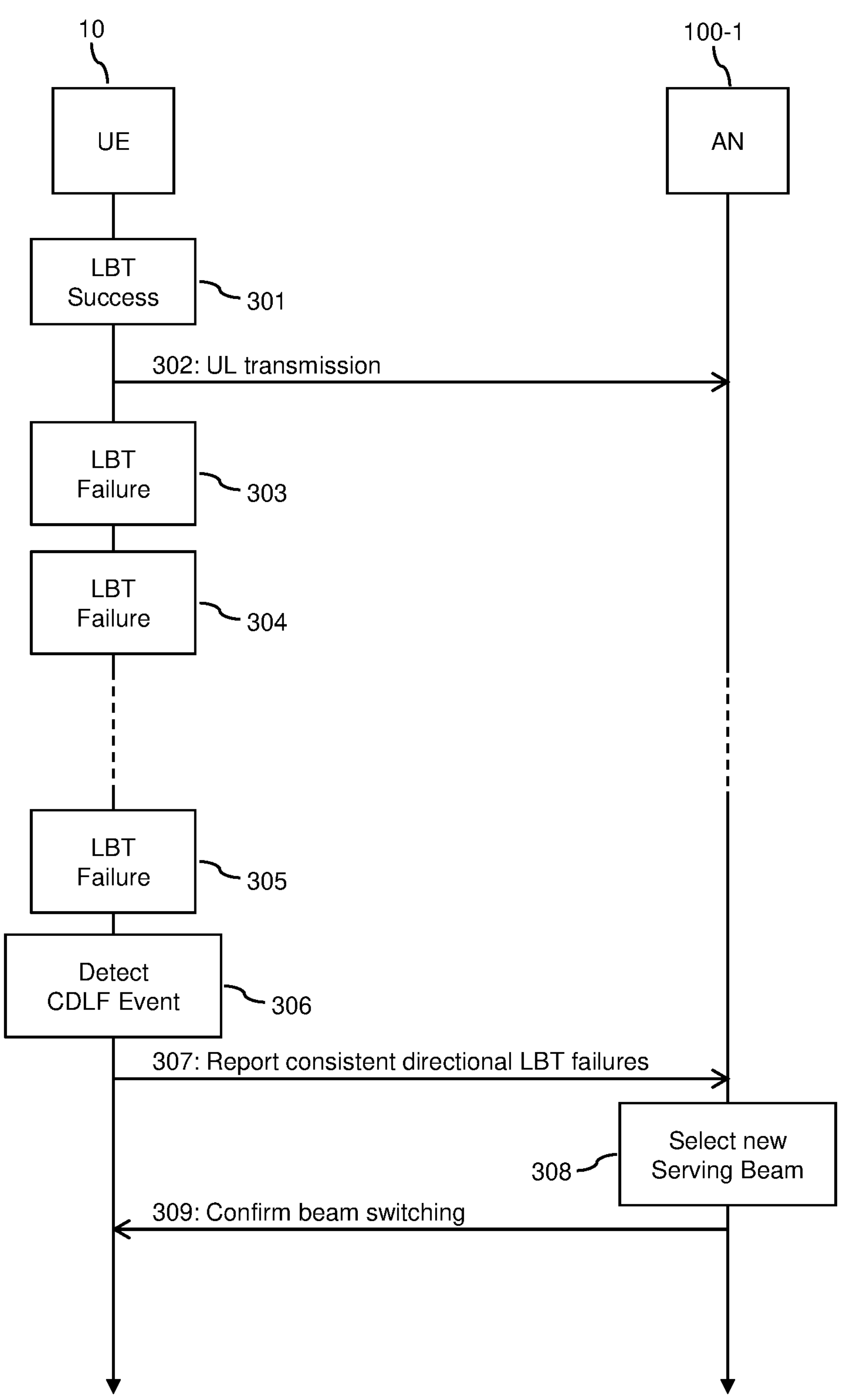
FIG. 3 schematically illustrates an example of processes for handling directional LBT failures according to an embodiment.

FIG. 3 shows an example of processes involving handling UL LBT failures according to the illustrated concepts. The processes of FIG. 3 involve UE 10 and access node 100-1.

At block 301, the UE 10 performs a directional LBT procedure to gain access to radio resources of the serving beam 22 between the UE 10 and the access node 100-1. The radio resources may be in a certain BWP and shared with other UEs using the NR technology, or even with one or more other radio technologies. As mentioned above, the radio resources may be from an unlicensed spectrum. The directional LBT procedure involves that the UE applies a CCA check, i.e., channel sensing, before attempting a directional UL transmission. The channel sensing may involve energy detection (ED) on the channel over a time period, and comparison of the detected energy to a certain threshold (ED threshold), in order to determine whether the channel is idle or occupied. If the channel is determined to be occupied, the UE 10 performs a random back-off within a contention window before the next CCA attempt. If the UE 10 has gained access to the channel, the UE 10 is allowed to perform a directional UL transmission on the serving transmission beam. The UL transmission may be limited to a maximum time duration, defined by a maximum channel occupancy time (MOOT). In the illustrated example, it is assumed that the LBT procedure of block 301 results in an LBT success. Accordingly, the UE 10 gains access to the radio resources on the serving transmission beam and can proceed to perform the directional UL transmission 302.

At blocks 303, 304, and 305, the UE 10 performs further directional LBT procedures to gain access to the radio resources of the serving transmission beam 22 between the UE 10 and the access node 100-1. For these LBT procedures, it is however assumed that they each result in a failure to gain access to the radio resources of the serving beam 22, due to sensing that the radio resources are occupied. These UL directional LBT failures may be detected at the PHY layer of the UE 10 and then indicated to the MAC layer. The MAC layer may maintain a beam-specific counter for monitoring the number of UL directional LBT failures on a per beam basis. If the counter exceeds a threshold, the UE 10 declares a CDLF event, as illustrated by block 306. The counter is reset at pre-configured time intervals. The CDLF event thus corresponds to occurrence of a certain number of UL directional LBT failures in a given time interval.

For example, the detection of the CDLF event could be based on using RRC to define a configuration denoted as directional-lbt-FailureRecoveryConfig with the following parameters:

- directional-lbt-FailureInstanceMaxCount for the consistent LBT failure detection; and
- directional-lbt-FailureDetectionTimer for the consistent LBT failure detection.

The UE 10 may use a variable referred to as DIR_LBT_COUNTER(i) as the counter for the UL directional LBT failures, where i denotes an index of the current serving beam. The variable DIR_LBT_COUNTER(i) is initially set to 0, is incremented with each detected UL directional LBT failure, and is reset if the directional-lbt-FailureDetectionTimer expires. A consistent UL directional LBT failure is detected if DIR_LBT_COUNTER(i) reaches or exceeds the parameter directional-lbt-FailureInstanceMaxCount.

In response to the CDLF event detected at block 306, the UE 10 sends a report message 307 to the access node 100-1. The report message indicates the detected UL directional LBT failures, in particular the occurrence of the CDLF event. The UE 10 may send the report message 307 on a beam that is different from the current serving beam.

The report message 307 may also include information indicating candidate beams that are preferred by the UE 10, such as indices of SSBs or SSB groups, indices of CSI-RS resources associated with the beams, indices of SRS resources associated with the beams, and/or indices of TCI (Transmission Configuration Indicator) states associated with the beams. Further, the report message 307 may include an index or other information identifying the current serving beam, on which the CDLF event was detected. The report message 307 may also carry radio quality measurement results of other beams or SSBs. This information may enable the access node 100-1 to select a new serving beam or SSB for the UE 10 based on the measurement results.

In response to receiving the report message, access node 100-1 may select a new serving beam for the UE 10, e.g., one of the beams 21, 23, as indicated by block 308. The new serving beam may be selected among the candidate beams indicated in the report message 307. The access node 100-1 may then send a confirmation message 309 to the UE 10 to confirm switching to the new serving beam. In some scenarios, the UE 10 may send the report message 307 on a preferred one of the candidate beams, and the access node 100-1 may use the confirmation message 309 to confirm switching to this candidate beam. In other scenarios, the confirmation message 309 may initiate switching to another one of the candidate beams, which is preferred according to information available at the access node 100-1.

Figure 4:
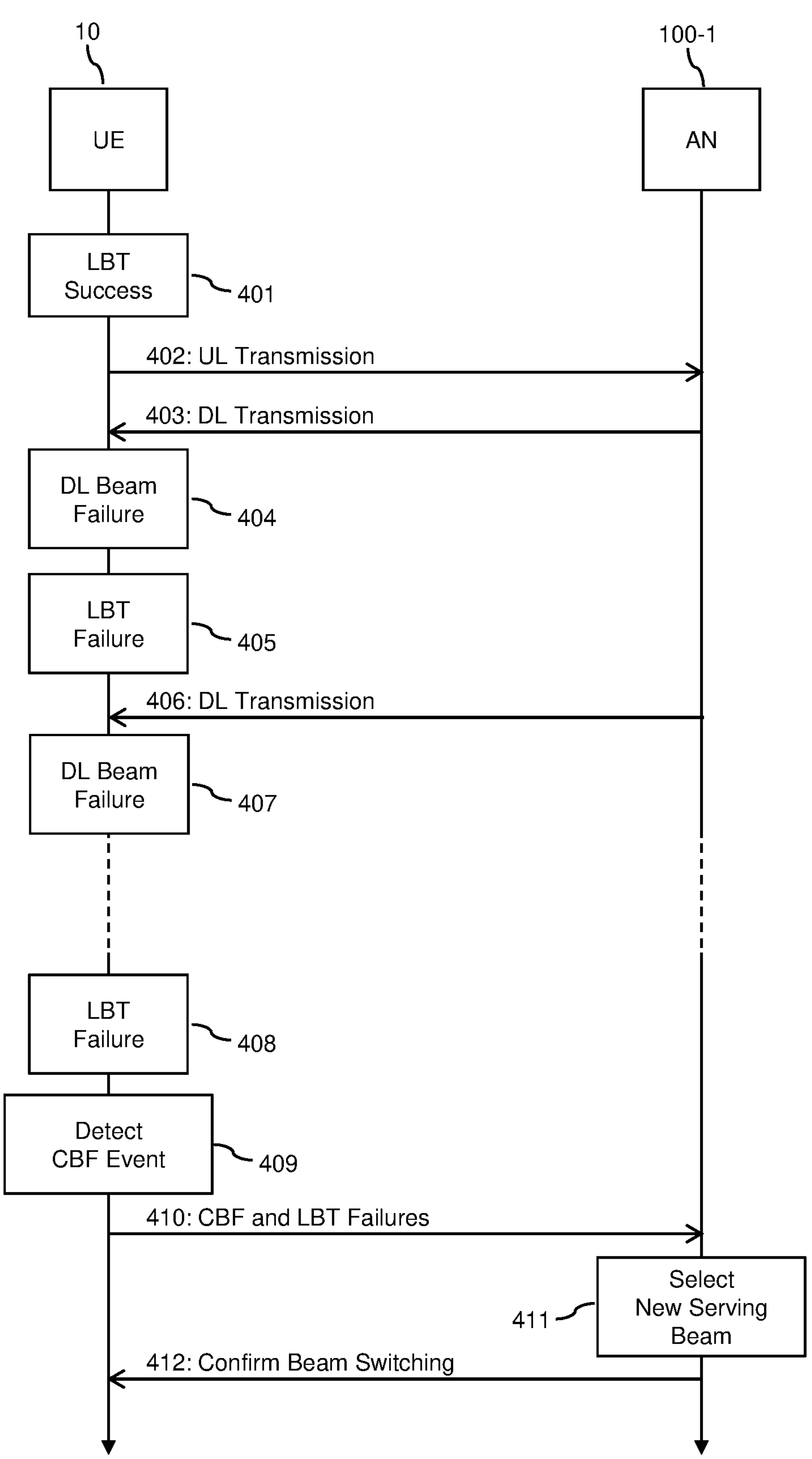
FIG. 4 schematically illustrates a further example of processes for handling directional LBT failures according to an embodiment.

In some scenarios, detection and reporting of the UL directional LBT failures may be combined with a beam failure detection (BFD) procedure. FIG. 4 illustrates an example of corresponding processes. The processes of FIG. 4 involve UE 10 and access node 100-1.

At block 401, the UE 10 performs a directional LBT procedure to gain access to radio resources of the serving beam 22 between the UE 10 and the access node 100-1. The radio resources may be in a certain BWP and shared with other UEs using the NR technology or even with one or more other radio technologies. As mentioned above, the radio resources may be from an unlicensed spectrum. The directional LBT procedure involves the UE 0 applying a CCA check, e.g., channel sensing, before attempting a directional UL transmission. The channel sensing may involve energy detection (ED) on the channel over a time period and comparison of the detected energy to a certain threshold (ED threshold), in order to determine whether the channel is idle or occupied. If the channel is determined to be occupied, the UE 10 performs a random back-off within a contention window before the next CCA attempt. If the UE 10 has gained access to the channel, the UE 10 is allowed to perform a directional UL transmission on the serving transmission beam. The UL transmission may be limited to a maximum time duration, defined by a maximum channel occupancy time (MOOT). In the illustrated example, it is assumed that the LBT procedure of block 401 results in an LBT success. Accordingly, the UE 10 gains access to the radio resources on the serving transmission beam and can proceed to perform the directional UL transmission 402.

As further illustrated, the access node 100-1 also sends a DL transmission 403 to the UE 10. The DL transmission 403 may, for example, correspond to a (hypothetical) PDCCH transmission. By monitoring DL transmission 403, the UE 10 determines a BLER (Block Error Rate) and detects a DL beam failure event by determining when the BLER is above a threshold for a certain time. For example, at block 404 the UE 10 detects a DL beam failure on the basis of DL transmission 403. The DL beam failure may be detected at the PHY layer of the UE 10 and then indicated to the MAC layer. The MAC layer may maintain a beam-specific counter for monitoring the number of DL beam failures on a per beam basis.

At block 405, the UE 10 performs a further directional LBT procedure to gain access to the radio resources of the serving beam 22 between the UE 10 and the access node 100-1. For this LBT procedure, it is however assumed that it results in a failure to gain access to the radio resources of the serving beam 22, due to sensing that the radio resources are occupied. The UL directional LBT failure may be detected at the PHY layer of the UE 10 and then indicated to the MAC layer. The MAC layer may maintain a beam-specific counter for monitoring the number of UL directional LBT failures on a per beam basis.

As illustrated by DL transmission 406 and blocks 407, 408, UE 10 may continue monitoring for DL beam failures and UL directional LBT failures. In the illustrated example, at block 407 the UE 10 detects a further DL beam failure based on the DL transmission 406, and at block 408 the UE 10 detects a further UL directional LBT failure. The UE 10 increments the corresponding per beam counters accordingly.

At block 409, the UE 10 uses the counters as a basis for detecting a consistent beam failure (CBF) event. For example, the UE 10 may compare the combined value of the counters to a configured threshold, and declare the BFD event in response to the combined value reaching or exceeding the threshold. In this case, also a single counter could be used for counting both the UL directional LBT failures and the DL beam failures. In other examples, the UE 10 may individually compare the values of the counters to a corresponding configured threshold, and declare the BFD event in response to at least one of the counter values reaching or exceeding the corresponding threshold.

Upon detecting the CBF event at block 409, the UE 10 sends a report message 410 indicating the CBF event and the detected UL directional LBT failures to the access node 100-1. The UE 10 may send the report message 410 on a beam that is different from the current serving beam.

The report message 410 may, for example, be implemented by a Beam Failure Recovery Request (BFRQ) message of a Beam Failure Recovery (BFR) procedure, e.g., as described in 3GPP TS 38.321 V15.8.0. The BFRQ message may be extended to include one or multiple of below additional information, e.g., a ratio of the number of UL directional LBT failures to number of DL beam failures or to total number of UL directional LBT failures and DL beam failures, a number of DL beam failures, and/or a number of UL directional LBT failures.

The report message 410 may also include information indicating candidate beams that are preferred by the UE 10, e.g., indices of SSBs or SSB groups, indices of CSI-RS resources associated with the beams, indices of SRS resources associated with the beams, and/or indices of TCI states associated with the beams. Further, report message 410 may include an index or other information identifying the current serving beam, on which the CBF event was detected. Further, the report message 410 may also carry radio quality measurement results of other beams or SSBs. This information may enable the access node 100-1 to select a new serving beam or SSB for the UE 10 based on the measurement results.

In response to receiving the report message, access node 100-1 may select a new serving beam for the UE 10, e.g., one of the beams 21, 23, as indicated by block 411. The new serving beam may be selected among the candidate beams indicated in the report message 410. The access node 100-1 may then send a confirmation message 412 to the UE 10 to confirm switching to the new serving beam. In some scenarios, UE 10 may send the report message 410 on a preferred one of the candidate beams, and access node 100-1 may use the confirmation message 412 to confirm switching to this candidate beam. In other scenarios, the confirmation message 412 may initiate switching to another one of the candidate beams, which is preferred according to information available at the access node 100-1.

The UE 10 may utilize various options to send the report message 307, 410 indicating the detected directional LBT failures to the access node 100-1.

Figure 5:
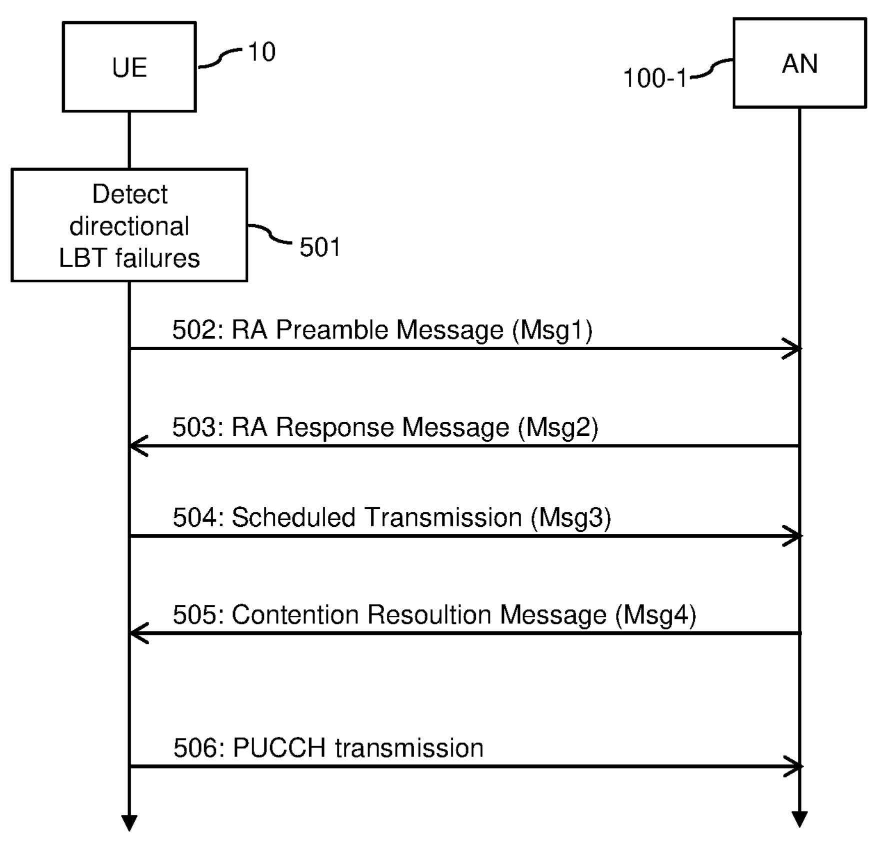
FIG. 5 schematically illustrates an example of processes for sending a failure report for indicating directional LBT failures according to an embodiment.
Figure 6:
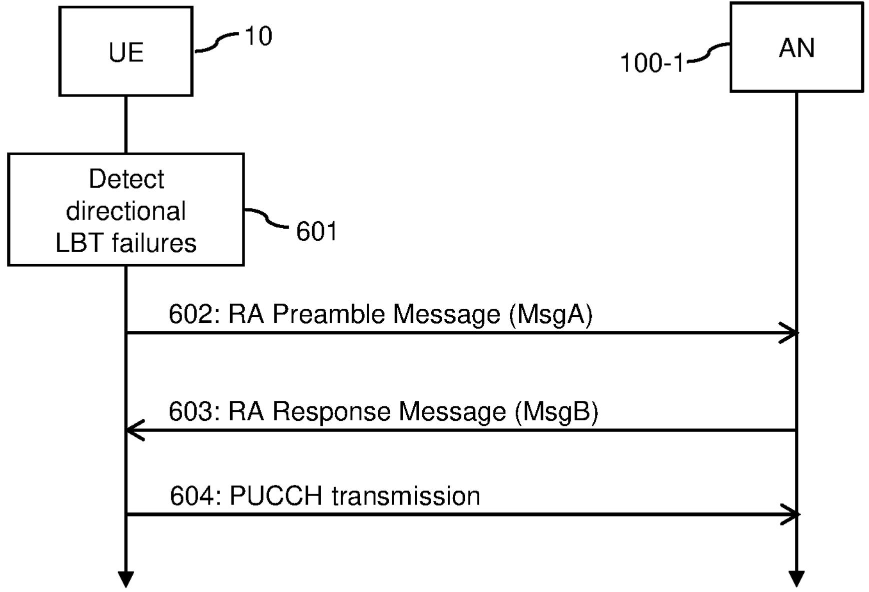
FIG. 6 schematically illustrates a further example of processes for sending a failure report for indicating directional LBT failures according to an embodiment.

According to a first option, UE 10 may initiate a RACH procedure to send the report message 307, 410 indicating the detected directional LBT failures. The RACH procedure may be initiated on a different beam/SSB. FIGS. 5 and 6 illustrate examples of RACH procedures that may be used to send the report message 307, 410 indicating the detected directional LBT failures.

In the example of FIG. 5, a four-step RA procedure is triggered to send the report message 307, 410 indicating the detected directional LBT failures. At block 501, the UE 10 detects the directional LBT failures, e.g., as a CDLF event like in the example of FIG. 3 or associated with a CBF event like in the example of FIG. 4. In response, the UE 10 initiates the four-step RA on another beam/SSB, e.g., the beam 21 or 23 of FIG. 2.

As illustrated, the four-step RA procedure involves that the UE 10 sends an RA preamble message 502 (also referred to as Message 1 ("Msg1")) to the access node 100-1. The access node responds by sending an RA response message 503 (also referred to as Message 2 ("Msg2")) to the UE 10. The UE 10 then sends a scheduled transmission 504 (also referred to as Message 3 ("Msg3")) to the access node 100-1. The scheduled transmission 504 is scheduled by the RA response 503. The access node 100-1 then sends a contention resolution message 505 (also referred to as Message 4 ("Msg4")) to the UE 10. Subsequently, the UE 10 may also send a PUCCH transmission 506 to the access node 100-1.

In an example, the RA preamble message 502, i.e., Msg1, may be used to send the report message 307, 410 indicating the detected directional LBT failures. For this purpose, a dedicated RA preamble may be allocated to the UE 10 for indicating the report message 307, 410. Alternatively or additionally, or dedicated RACH occasions may be allocated to the UE 10 for indicating the report message 307, 410. The UE 10 may thus send the report message 307, 410 indicating the detected directional LBT failures by sending the RA preamble message 502 with the dedicated RA preamble allocated for this purpose and/or by sending the RA preamble message 502 on the dedicated RACH occasions allocated for this purpose.

In a further example, the scheduled transmission 504, i.e., Msg3, may be used to send the report message 307, 410 indicating the detected directional LBT failures. In particular, the scheduled transmission 504 may be extended to indicate the report message 307, 410. For example, the UE MAC entity may add a corresponding indicator to the scheduled transmission. The indicator may be a field in the MAC subheader of the scheduled transmission 504 or may be carried in a MAC CE of the scheduled transmission 504. In a still further example, an RRC message may be included in the scheduled transmission 504, and the RRC message may include the indicator of the report message 307, 410.

In the example of FIG. 6, the a two-step RA procedure is triggered to send the report message 307, 410 indicating the detected directional LBT failures. At block 601, the UE 10 detects the directional LBT failures, e.g., as a CDLF event like in the example of FIG. 3 or associated with a CBF event like in the example of FIG. 4. In response, the UE 10 initiates the two-step RA on another beam/SSB, e.g., the beam 21 or 23 of FIG. 2.

As illustrated, the two-step RA procedure involves that the UE 10 sends an RA preamble message 602 (also referred to as "MsgA") to the access node 100-1. The access node responds by sending an RA response message 603 (also referred to as "MsgB") to the UE 10. Subsequently, the UE 10 may also send a PUCCH transmission 604 to the access node 100-1.

In an example, the RA preamble message 602, e.g., MsgA, may be used to send the report message 307, 410 indicating the detected directional LBT failures. For this purpose, a dedicated RA preamble may be allocated to the UE 10 for indicating the report message 307, 410. Alternatively or additionally, or dedicated RACH occasions may be allocated to the UE 10 for sending the report message 307, 410. The UE 10 may thus send the report message 307, 410 by sending the RA preamble message 602 with the dedicated RA preamble allocated for this purpose and/or by sending the RA preamble message 602 on the dedicated RACH occasions allocated for this purpose. In a further example, the RA preamble message 602 may be extended to indicate the report message 307, 410. For example, the UE MAC entity may add a corresponding indicator to the RA preamble message 602. The indicator may be a field in the MAC subheader of the RA preamble message 602 or may be carried in a MAC CE of the RA preamble message 602. In a still further example, an RRC message may be included in the RA preamble message 602, and the RRC message may include the indicator of the report message 307, 410.

According to a further option, the UE 10 may initiate a PUCCH transmission to send the report message 307, 410 indicating the detected directional LBT failures. The PUCCH transmission may be initiated on a different beam/SSB. For example, the PUCCH transmission 506 of FIG. 5 or the PUCCH transmission 604 of FIG. 6 could be used to send the report message 307, 410 indicating the detected directional LBT failures. A separate PUCCH resource may be configured for the purpose of sending the report message 307, 410.

For any report message indicating detected directional LBT failures for a beam, e.g., the above-mentioned report messages 407, 410, various additional information may be reported in one or multiple report messages. Such additional information may be reported for a measurement object, a carrier, for a group of carriers, for a certain PLMN (Public Land Mobile Network), for a cell, per PCI (Physical Cell Identity), per BWP, per beam/SSB, or the like. Examples of such additional information include:

- Channel occupancy, e.g. based on RSSI;
- LBT statistics e.g. number of LBT failures and/or successes, LBT failure/success ratio (e.g. calculated over a certain time period or using exponential averaging of successive time periods), LBT failure rate (e.g. calculated over a certain time period or using exponential averaging of successive time periods), LBT modes, such as LBE (Load Based Equipment) or FBE (Frame Based Equipment) and LBT types (i.e., Category 1, 2, 3 or 4) with which the UE has detected LBT failures. Either of these could be reported per LBT type or per CAPC (Channel Access Priority Class), or per UL/DL, or per service/LCH (Logical Channel)/LCG (Logical Channel Group);
- Radio quality indicators, e.g., RSRP (Reference Signal Received Power), RSRQ (Reference Signal Received Quality), RSSI (Received Signal Strength Indicator), SNR (Signal-to-Noise Ratio), SINR (Signal-to-Interference-plus-Noise Ratio), or the like;
- Service QoS (Quality of Service) indicators such as latency, packet loss, priority, jitter etc.;
- Buffer status report;
- Power headroom report; and/or
- The indices for cells/BWPs/carriers/channels/sub-bands/PLMNs that suffer from LBT failures or high channel occupancy.

In the above scenarios, the UE 10 and/or the access node 100-1 may initiate various recovery actions in response to detecting the UL directional LBT failures, e.g., as a CDLF event or associated with a CBF event.

According to a first option, if the UL directional LBT failures are detected on a serving beam in a LBT subband/channel of a BWP, the UE 10 may switch to a new serving beam. On the new serving beam, the UE 10 can continue to use the same LBT subband/channel or BWP. The UE 10 may thus use resources in the same frequency region as before the directional LBT failures were detected. Due to the UE 10 switching to a different beam, the directional LBT failures may be resolved.

According to a second option, if the UL directional LBT failures are detected for a number of configured beams in a LBT subband/channel of a BWP, the UE 10 may switch to another LBT subband/channel in the same BWP. In this case, there is a high probability that the LBT subband/channel is congested at all directions, and it is beneficial for the UE 10 to switch to a different LBT subband/channel.

According to a third option, if the UL directional LBT failures are detected for a number of configured beams in a BWP of the cell 101-1, the UE 10 may switch to another BWP in the same cell 100-1. In this case, there is a high probability that the BWP is congested at all directions, and it is beneficial for the UE 10 to switch to a different BWP.

According to a fourth option, if the UL directional LBT failures are detected for a number of configured beams in a number of configured BWPs of a cell, the UE 10 may declare a Radio Link Failure (RLF) event and perform an RLF recovery procedure to switch to a different cell, e.g., cell 101-2. In this case, there is a high probability that cell 101-1 is congested in all directions, and it is beneficial for the UE 10 to switch to a different cell, e.g., cell 101-2.

For any of the above options, the access node 100-1 may configure a group of beams, and/or a group of BWPs for the UE 10, and if UL directional LBT failures are detected on all these configured beams and/or BWPs, the UE 10 can trigger a recovery option as defined above.

In some scenarios, upon an RA message or a PUCCH transmission that doesn't carry an indicator of detected UL directional LBT failures on the serving beam, the access node 100-1 may determine if the RA is triggered due to UL directional LBT failures, considering one or more of the following criteria:

- whether the beam or SSB associated with the RA message is different from the current serving beam that is used for PUSCH (Physical Uplink Shared Channel) transmissions of the UE 10;
- whether the beam or SSB associated with the RA message is different from the current serving beam that is used for PUCCH transmissions of the UE 10;
- whether the beam or SSB associated with the RA message is different from the current serving beam that is used for DL transmission to the UE 10; and/or
- whether the RA is triggered by a beam failure event due to occurrence of DL beam failure instances.

These criteria may be used by the access node 100-1 for implicitly deriving that the RA is due to detected UL directional LBT failures on the serving beam.

In some scenarios, access node 100-1 confirms reception of the report message indicating the detected UL directional LBT failures, e.g., by the above-mentioned confirmation message 309 or 412. The confirmation may be indicated in DCI (Downlink Control Information) sent by the access node 100-1. The DCI may be addressed to the UE 10 by using a C-RNTI associated with the UE 10. As an alternative, the confirmation message may be based on RRC signaling or a MAC CE. Based on the report message indicating the detected UL directional LBT failures, the access node 100-1 may avoid performing a radio connection re-establishment for the UE 10. The access node 100-1 may provide further signaling to instruct UE 10 to perform further actions. For example, the access node 100-1 may indicate a beam that the UE 10 may use for subsequent UL transmission or subsequent DL reception.

Figure 7:
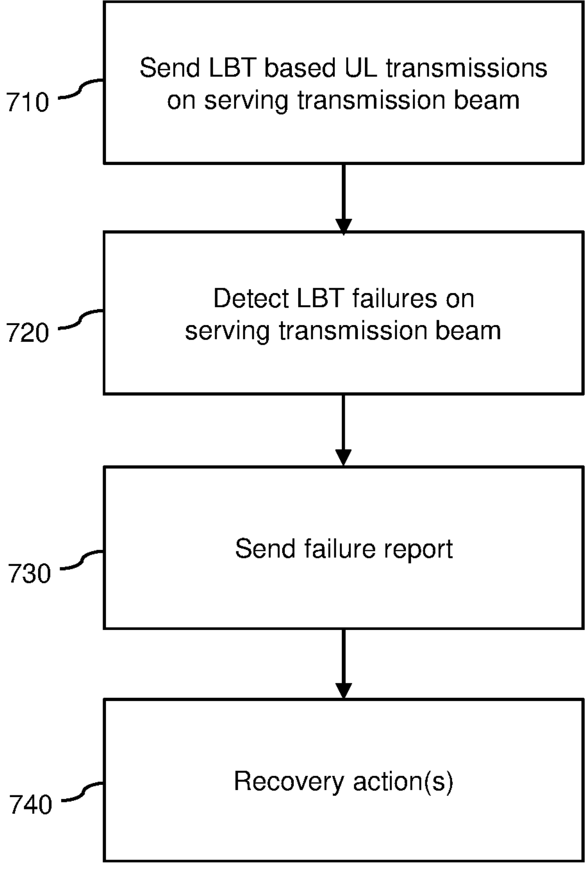
FIG. 7 shows a flowchart for schematically illustrating a method according to an embodiment.

FIG. 7 shows a flowchart for illustrating a method, which may be utilized for implementing the illustrated concepts. The method of FIG. 7 may be used for implementing the illustrated concepts in a wireless device, such as the above-mentioned UE 10.

If a processor-based implementation of a wireless device is used, at least some of the steps of the method of FIG. 7 may be performed and/or controlled by one or more processors of the wireless device. Such a wireless device may also include a memory storing program code for implementing at least some of the below described functionalities or steps of the method of FIG. 7.

At block 710, the wireless devices sends LBT based UL transmissions on a serving transmission beam to an access node, such as one of the above-mentioned access nodes 100-1, 100-2. The serving transmission beam is selected from a plurality of transmission beams, such as the above-mentioned beams 21, 22, 23.

At block 720, the wireless device detects LBT failures on the serving transmission beam.

At block 730, the wireless device sends a failure report to the access node. The wireless device sends the failure report based on the number of the detected LBT failures on the serving transmission beam. The failure report indicates the detected LBT failures on the serving transmission beam. The above-mentioned report messages 307 and 410 constitute examples of such failure reports.

In some scenarios, the failure report may include an identifier of the serving transmission beam, e.g., in terms of a beam index or other identifier.

In some scenarios, the failure report may identify one or more candidate transmission beams for selection of a new serving transmission beam, e.g., in terms of beam indices or other identifiers. In some scenarios, the failure report may identify at least one SSB or SSB group corresponding to the one or more candidate transmission beams. In some scenarios, the failure report may identify CSI-RS resources associated with the one or more candidate transmission beams. In some scenarios, the failure report may identify SRS resources associated with the one or more candidate transmission beams. In some scenarios, the failure report may identify TCI states associated with the one or more candidate transmission beams.

In some scenarios, the wireless device may select another one of the plurality of transmission beams and send the failure report on the other transmission beam. This other transmission beam may, for example, correspond to one of the candidate transmission beams, e.g., a preferred one of the candidate transmission beams.

In some scenarios, the wireless device may perform an RA procedure on the other transmission beam and send the failure report by a message of the RA procedure. The RA procedure may correspond to a four-step RA procedure, e.g., as illustrated in FIG. 5, or to a two-step RA procedure, e.g., as illustrated in FIG. 6.

In this case, the wireless device may, for example, send the failure report by an RA preamble message of the RA procedure, e.g., the above-mentioned RA preamble message 502 or 602. This may involve that the wireless device provides the RA preamble message with an RA preamble that is allocated for indicating the failure report. Alternatively or additionally, this may involve the wireless device sending the RA preamble message on an RA occasion that is allocated for indicating the failure report. Alternatively or additionally, this may involve the wireless device providing the RA preamble message with an indicator for indicating the failure report. The indicator may be provided in a MAC header of the RA preamble message or in a MAC CE of the RA preamble message.

Further, the wireless device may send the failure report by a scheduled transmission of the RA procedure, e.g., the above-mentioned scheduled transmission 504. In this case, the wireless device may provide the scheduled transmission with an indicator for indicating the failure report. The indicator may be provided in a MAC header of the scheduled transmission or in a MAC CE of the scheduled transmission.

In some scenarios, the wireless device may also send the failure report by an RRC message included in a message of the RA procedure. In this case, the wireless device may provide the RRC message with an indicator for indicating the failure report.

In some scenarios, the wireless device may also send the failure report on an uplink control channel of the other transmission beam, e.g., on a PUCCH like explained for PUCCH transmission 506 or 604. In this case, the wireless device may send the failure report on one or more resources of the uplink control channel, which are configured for indicating the failure report.

In some scenarios, the wireless device may also report additional information associated with the failure report, e.g., by using one or more additional report messages. The additional information may include at least one of: channel occupancy, LBT statistics, one or more radio quality indicators, one or more quality of service indicators, one or more buffer status reports, and one or more power headroom reports. The wireless device may report the additional information per measurement object, per carrier, per group of carriers, for a certain PLMN, per cell, per PCI, per BWP, and/or per transmission beam.

In some scenarios, the wireless device may send the failure report in response to the number of detected LBT failures reaching a threshold value. For example, the wireless device may monitor the number of detected LBT failures by a counter. Upon detecting an LBT failure, the wireless device may start a timer. Starting the timer may involve initial starting of the timer or restarting of the timer. The wireless device may then send the failure report in response to the counter reaching the threshold value. Upon expiry of the timer before the counter reaches the threshold value, the wireless device may reset the counter to zero.

In some scenarios, the wireless device may further detect beam failures. This may be accomplished based on a DL signal received on the transmission beam, e.g., as explained in connection with FIG. 4 for the DL beam failures. In this case, the wireless device may send the failure report in response to a combined number, e.g., a total number, of the detected LBT failures and the detected beam failures reaching a threshold value. The failure report may then indicate the number of the detected beam failures and the number of the detected LBT failures and/or a ratio of the number of the detected LBT failures to the combined number of the detected LBT failures and the detected beam failures. For example, the wireless device may monitor the combined number of detected LBT failures and of beam failures by a counter. Upon detecting an LBT failure or beam failure the wireless device may start a timer. Starting the timer may involve initial starting of the timer or restarting of the timer. The wireless device may then send the failure report in response to the counter reaching the threshold value. Upon expiry of the timer before the counter reaches the threshold value, the wireless device may reset the counter to zero.

In some scenarios, the wireless device may send the failure report in a message of a BFR procedure.

At block 740, the wireless device may perform one or more recovery actions for resolving the detected LBT failures on the serving transmission beam. The wireless device can initiate or otherwise participate in the recovery action(s). For example, in response to the detected LBT failures on the serving transmission beam, the wireless device may initiate switching to a new serving transmission beam. Further, in response to the detected LBT failures on the serving transmission beam, the wireless device may initiate switching to a new serving transmission beam utilizing frequency resources, which correspond to frequency resources used on the serving transmission beam. Further, in response to the detected LBT failures on the serving transmission beam, the wireless device may initiate switching to a new serving transmission beam and to frequency resources that differ from frequency resources used on the serving transmission beam. The frequency resources on the new transmission beam and the frequency resources on the previous transmission beam may then differ with respect to utilized frequency resources within the same BWP or with respect to utilized BWP. Further, in response to the detected LBT failures on the serving transmission beam, the wireless device may initiate switching to another cell of the wireless communication system.

Figure 8:
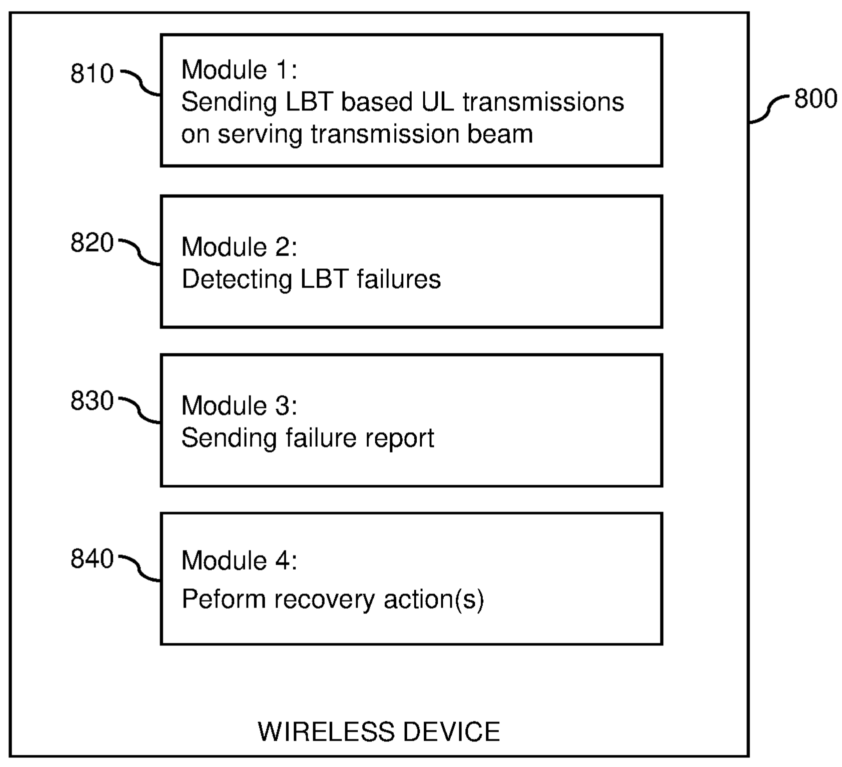
FIG. 8 shows a block diagram for schematically illustrating functionalities of a wireless device according to an embodiment.

FIG. 8 shows a block diagram for illustrating functionalities of a wireless device 800 that operates according to the method of FIG. 7. Wireless device 800 may, for example, correspond to the above-mentioned UE 10. As illustrated, the wireless device 800 may be provided with a module 810 configured to send LBT-based UL transmissions on a serving transmission beam, e.g., as explained in connection with block 710. Further, the wireless device 800 may be provided with a module 820 configured to detect LBT failures on the serving transmission beam, e.g., as explained in connection with block 720. Further, the wireless device 800 may be provided with a module 830 configured to send a failure report indicating the detected LBT failures on the serving transmission beam, e.g., as explained in connection with block 730. Further, the wireless device 800 may be provided with a module 840 configured to perform one or more recovery actions, e.g., as explained in connection with block 740.

It is noted that the wireless device 800 may include further modules for implementing other functionalities, e.g., as known functionalities of various kinds of UE. Further, it is noted that the modules of the wireless device 800 do not necessarily represent a hardware structure of the wireless device 800, but may also correspond to functional elements, e.g., implemented by hardware, software, or a combination thereof. It will be appreciated that each of the modules described herein may be implemented via circuitry and/or software code.

Figure 9:
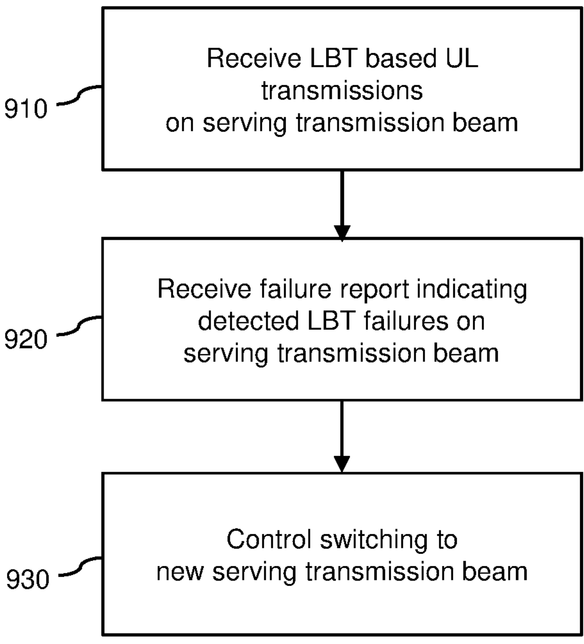
FIG. 9 shows a flowchart for schematically illustrating a further method according to an embodiment.

FIG. 9 shows a flowchart for illustrating a method, which may be utilized for implementing the illustrated concepts. The method of FIG. 9 may be used for implementing the illustrated concepts in an access node, e.g., one of the above-mentioned access nodes 100-1, 100-2.

If a processor-based implementation of access node is used, at least some of the steps of the method of FIG. 9 may be performed and/or controlled by one or more processors of the access node. Such an access node may also include a memory storing program code for implementing at least some of the below described functionalities or steps of the method of FIG. 9.

At block 910, the access node receives LBT based UL transmissions on a serving transmission beam from a wireless device, e.g., one of the above-mentioned UE 10. The serving transmission beam is selected from a plurality of transmission beams, e.g., the above-mentioned beams 21, 22, 23.

At block 920, the access node receives a failure report from the wireless device. The failure report may be sent based on the number of the detected LBT failures on the serving transmission beam. The failure report indicates the detected LBT failures on the serving transmission beam. The above-mentioned report messages 307 and 410 constitute examples of such failure report.

In some scenarios, the failure report may include an identifier of the serving transmission beam, e.g., in terms of a beam index or other identifier.

In some scenarios, the failure report may identify one or more candidate transmission beams for selection of a new serving transmission beam, e.g., in terms of beam indices or other identifiers. In some scenarios, the failure report may identify at least one SSB or SSB group corresponding to the one or more candidate transmission beams. In some scenarios, the failure report may identify CSI-RS resources associated with the one or more candidate transmission beams. In some scenarios, the failure report may identify SRS resources associated with the one or more candidate transmission beams. In some scenarios, the failure report may identify TCI states associated with the one or more candidate transmission beams.

In some scenarios, the access node may receive the failure report on another one of the transmission beams. This other transmission beam may, for example, correspond to one of the candidate transmission beams, e.g., a preferred one of the candidate transmission beams.

In some scenarios, the access node may receive the failure report by a message of an RA procedure. The RA procedure may correspond to a four-step RA procedure, e.g., as illustrated in FIG. 5, or to a two-step RA procedure, e.g., as illustrated in FIG. 6.

In this case, the access node may, for example, receive the failure report by an RA preamble message of the RA procedure, e.g., the above-mentioned RA preamble message 502 or 602. This may involve that the RA preamble message is provided with an RA preamble, which is allocated for indicating the failure report. Alternatively or additionally, this may involve that the access node receives the RA preamble message on an RA occasion that is allocated for indicating the failure report. Alternatively or additionally, this may involve that the RA preamble message is provided with an indicator for indicating the failure report. The indicator may be provided in a MAC header of the RA preamble message or in a MAC CE of the RA preamble message.

Further, the access node may receive the failure report by a scheduled transmission of the RA procedure, e.g., the above-mentioned scheduled transmission 504. In this case, the scheduled transmission may be provided with an indicator for indicating the failure report. The indicator may be provided in a MAC header of the scheduled transmission or in a MAC CE of the scheduled transmission.

In some scenarios, the access node may also receive the failure report by an RRC message included in a message of the RA procedure. In this case, the RRC message may be provided with an indicator for indicating the failure report.

In some scenarios, the access node may detect the failure report based on determining that the RA procedure is performed on the other transmission beam. The failure report may thus be detected without requiring any specific indicator in a message of the RA procedure.

In some scenarios, the access node may also receive the failure report on an uplink control channel of the other transmission beam, e.g., on a PUCCH like explained for PUCCH transmission 506 or 604. In this case, the access node may receive the failure report on one or more resources of the uplink control channel that are configured for indicating the failure report. In some scenarios, the access node may detect the failure report based on determining that a transmission is performed on the uplink control channel of the other transmission beam. The failure report may thus be detected without requiring any specific indicator in the transmission on the uplink control channel.

In some scenarios, the access node may also receive additional information associated with the failure report, e.g., by using one or more additional report messages from the wireless device. The additional information may include at least one of: channel occupancy, LBT statistics, one or more radio quality indicators, one or more quality of service indicators, one or more buffer status reports, and one or more power headroom reports. The additional information may be reported per measurement object, per carrier, per group of carriers, for a certain PLMN, per cell, per PCI, per BWP, and/or per transmission beam.

In some scenarios, the failure report may be sent in response to the number of detected LBT failures reaching a threshold value.

In some scenarios, the failure report may be sent in response to a combined number, e.g., a total number, of the detected LBT failures and of beam failures, detected based on a downlink signal from the access node, reaching a threshold value. The failure report may then indicate the number of the detected beam failures and the number of the detected LBT failures and/or a ratio of the number of the detected LBT failures to the combined number of the detected LBT failures and the detected beam failures.

In some scenarios, the access node nay receive the failure report in a message of a BFR procedure.

At block 930, the access node controls switching of the wireless device to a new serving transmission beam. This controlling is accomplished based on the failure report received at block 920. Further, this controlling may be based on the above-mentioned additional information, which is optionally received in association with the failure report. For example, in response to the failure report, the access node may initiate switching of the wireless device to a new serving transmission beam. Further, in response to the failure report, the access node may initiate switching of the wireless device to a new serving transmission beam utilizing frequency resources that correspond to frequency resources used on the serving transmission beam. Further, in response to the failure report, the access node may initiate switching of the wireless device to a new serving transmission beam and to frequency resources that differ from frequency resources used on the serving transmission beam. In this case, the frequency resources on the new transmission beam and the frequency resources on the previous transmission beam differ with respect to utilized frequency resources within the same BWP or with respect to utilized BWP. Further, in response to the failure report, the access node may initiate switching of the wireless device to another cell of the wireless communication system.

In some scenarios, the access node may receive the failure report on another transmission beam other than the serving transmission beam. In this case, the access node may, for example, select this other transmission beam as the new serving transmission beam.

In some scenarios, the access node may also send a confirmation of reception of the failure report to the wireless device, e.g., by the above-mentioned confirmation message 309 or 412.

Figure 10:
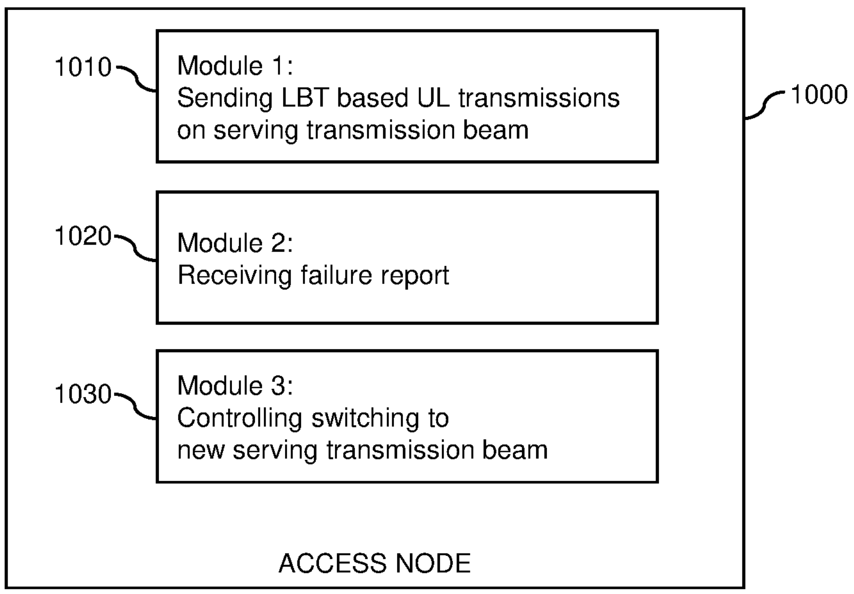
FIG. 10 shows a block diagram for schematically illustrating functionalities of an access node according to an embodiment.

FIG. 10 shows a block diagram for illustrating functionalities of an access node 1000 that operates according to the method of FIG. 9. Access node 1000 may, for example, correspond to one the above-mentioned access nodes 100-1 or 100-2. As illustrated, the access node 1000 may be provided with a module 1010 configured to receive LBT based UL transmissions on a serving transmission beam, e.g., as explained in connection with block 910. Further, the access node 1000 may be provided with a module 1020 configured to receive a failure report indicating detected LBT failures on the serving transmission beam, e.g., as explained in connection with block 920. Further, the access node 1000 may be provided with a module 1030 configured to control switching of the wireless device to a new serving transmission beam, e.g., as explained in connection with block 930.

It is noted that the access node 1000 may include further modules for implementing other functionalities, such as known functionalities of a gNB of the NR technology. Further, it is noted that the modules of the access node 1000 do not necessarily represent a hardware structure of the access node 1000, but may also correspond to functional elements, e.g., implemented by hardware, software, or a combination thereof. It will be appreciated that each of the modules described herein may be implemented via circuitry and/or software code.

Figure 11:
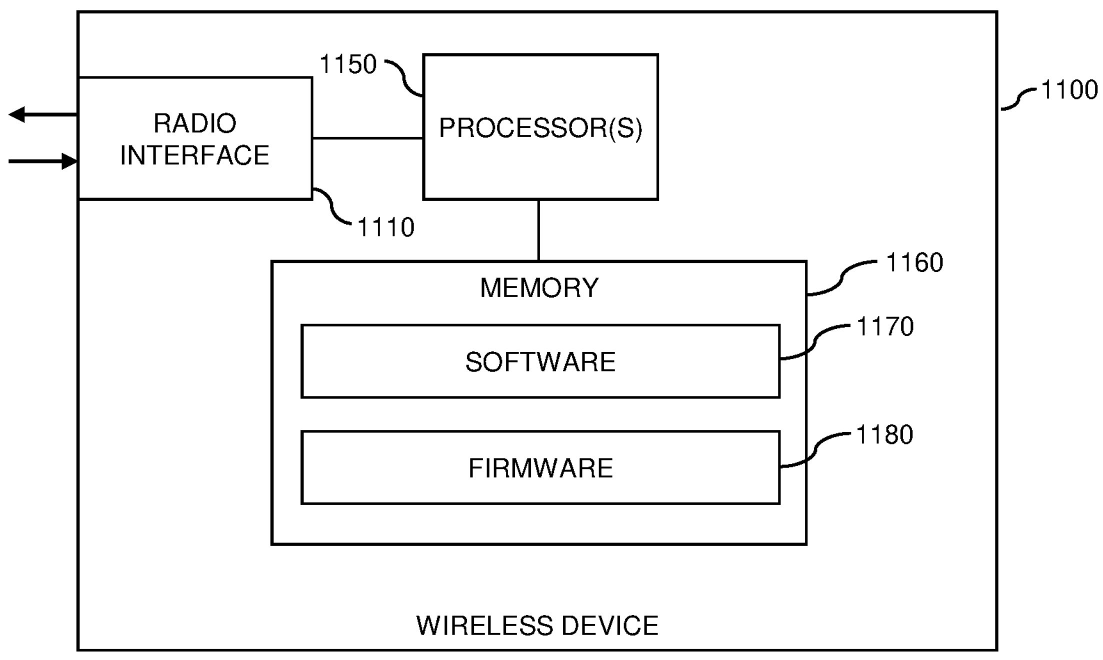
FIG. 11 schematically illustrates structures of a wireless device according to an embodiment.

FIG. 11 illustrates a processor-based implementation of a wireless device 1100 that may be used for implementing the above-described concepts. For example, the structures as illustrated in FIG. 11 may be used for implementing the concepts in the above-mentioned UE 10.

As illustrated, the wireless device 1100 includes one or more radio interfaces 1110. The radio interface(s) 1110 may, for example, be based on the NR technology and support beamformed transmission. However, other wireless technologies could be supported as well, e.g., the LTE technology.

Further, the wireless device 1100 may include one or more processors 1150 coupled to the radio interface(s) 1110 and a memory 1160 coupled to the processor(s) 1150. By way of example, the radio interface(s) 1110, the processor(s) 1150, and the memory 1160 may be coupled by one or more internal bus systems of the wireless device 1100. The memory 1160 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, memory 1160 may include software 1170 and/or firmware 1180. The memory 1160 may include suitably configured program code to be executed by the processor(s) 1150 so as to implement the above-described functionalities for controlling wireless transmissions, e.g., as explained in connection with FIGS. 7 and 8.

It is to be understood that the structures as illustrated in FIG. 11 are merely schematic and that the wireless device 1100 may actually include further components that, for the sake of clarity, have not been illustrated, e.g., further interfaces or further processors. Also, it is to be understood that the memory 1160 may include further program code for implementing known functionalities of a wireless device, e.g., functionalities of various kinds of UE. According to some embodiments, a computer program may also be provided for implementing functionalities of the wireless device 1100, e.g., in the form of a physical medium storing the program code and/or other data to be stored in the memory 1160 or by making the program code available for download or by streaming.

Figure 12:
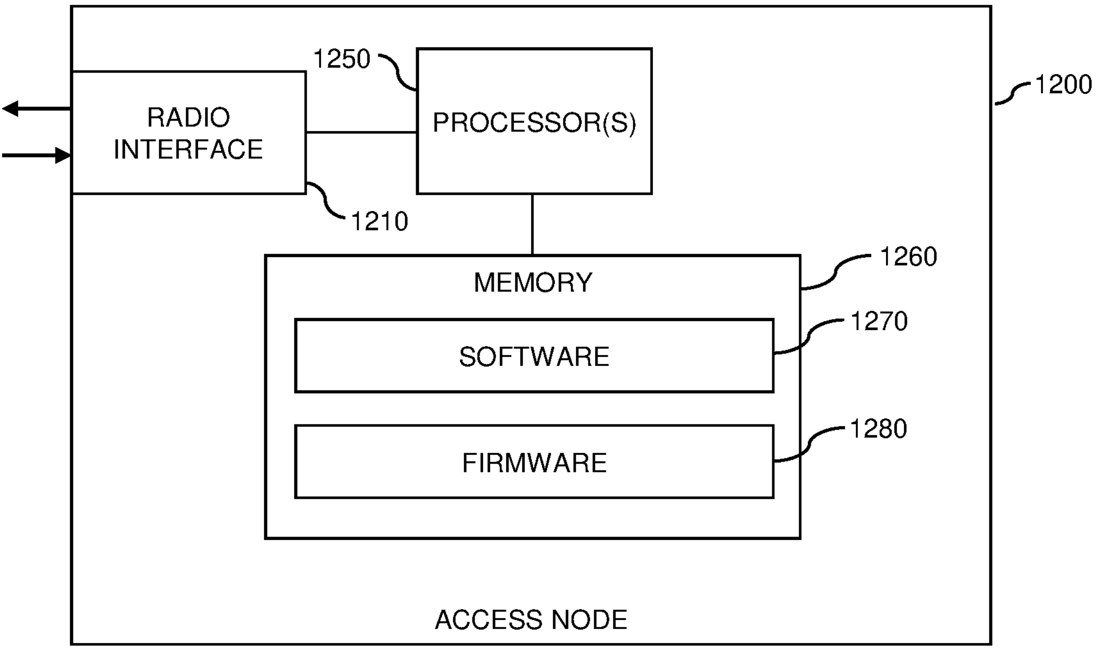
FIG. 12 schematically illustrates structures of an access node according to an embodiment.

FIG. 12 illustrates a processor-based implementation of an access node 1200 that may be used for implementing the above-described concepts. For example, the structures as illustrated in FIG. 12 may be used for implementing the concepts in any of the above-mentioned access nodes 100-1, 100-2.

As illustrated, access node 1200 includes one or more radio interfaces 1210. The radio interface(s) 1210 may, for example, be based on the NR technology and support beamformed transmission. However, other wireless technologies could be supported as well, e.g., the LTE technology.

Further, the access node 1200 may include one or more processors 1250 coupled to the radio interface(s) 1210 and a memory 1260 coupled to the processor(s) 1250. By way of example, the radio interface(s) 1210, the processor(s) 1250, and the memory 1260 may be coupled by one or more internal bus systems of the access node 1200. The memory 1260 may include a ROM, e.g., a flash ROM, a RAM, e.g., a DRAM or SRAM, a mass storage, e.g., a hard disk or solid state disk, or the like. As illustrated, memory 1260 may include software 1270 and/or firmware 1280. The memory 1260 may also include suitably configured program code to be executed by the processor(s) 1250 so as to implement the above-described functionalities for controlling wireless transmissions, e.g., as explained in connection with FIGS. 9 and 10.

It is to be understood that the structures as illustrated in FIG. 12 are merely schematic and that the access node 1200 may actually include further components which, for the sake of clarity, have not been illustrated, e.g., further interfaces or further processors. Also, it is to be understood that the memory 1260 may include further program code for implementing known functionalities of an access node, e.g., functionalities of a gNB of the NR technology. According to some embodiments, also a computer program may be provided for implementing functionalities of the access node 1200, e.g., in the form of a physical medium storing the program code and/or other data to be stored in the memory 1260 or by making the program code available for download or by streaming.

As can be seen, the concepts as described above may be used for efficiently controlling beamformed LBT based wireless transmissions, in particular with respect to the handling of consistent LBT failures on the serving beam. In particular, the concepts may help to avoid that a UE gets stalled on a serving beam due to occurrence of consistent UL LBT failures. Further, the UE may be enabled to quickly recover from the consistent LBT failures on the serving beam. As a result, interruption of a service utilized by the UE can be avoided.

It is to be understood that the examples and embodiments as explained above are merely illustrative and susceptible to various modifications. For example, the illustrated concepts may be applied in connection with various kinds of wireless technologies, without limitation to the NR technology. Further, the concepts may be applied with respect to various types of wireless devices and access nodes. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules, and that the apparatuses described herein may perform the methods herein and any other processing by implementing any functional means, modules, units, or circuitry.

The invention claimed is:

1. A method of controlling wireless transmissions in a wireless communication system, the method comprising:

on a single serving transmission beam selected from a plurality of transmission beams, a wireless device sending listen before talk (LBT) based uplink wireless transmissions to an access node;

the wireless device detecting LBT failures on the single serving transmission beam; and based on a number of the detected LBT failures on the single serving transmission beam exceeding a predetermined threshold for the beam, the wireless device sending a failure report to the access node, the failure report indicating the detected LBT failures on the single serving transmission beam.

2. The method of claim 1, wherein the failure report comprises an identifier of the serving transmission beam and identifies:

one or more candidate transmission beams for selection of a new serving transmission beam;

at least one synchronization block (SSB) or SSB group corresponding to the one or more candidate transmission beams;

channel state information reference signal (CSI-RS) resources associated with the one or more candidate transmission beams;
sounding reference signal (SRS) resources associated with the one or more candidate transmission beams; and
transmission configuration indicator (TCI) states associated with the one or more candidate transmission beams.

3. The method of claim 1, comprising the wireless device:
selecting a second transmission beam of the plurality of transmission beams;
sending the failure report on the second transmission beam;
performing a random access procedure on the second transmission beam; and
the wireless device sending the failure report by at least one message of the random access procedure.

4. The method of claim 3, comprising the wireless device:
sending the failure report by a random access preamble message of the random access procedure or a scheduled transmission, wherein the random access preamble message is:
provided with an indicator for indicating the failure report and a random access preamble that is allocated for indicating the failure report; and
sent on a random access occasion that is allocated for indicating the failure report.

5. The method of claim 3, comprising the wireless device sending the failure report by a radio resource control (RRC) message included in a message of the random access procedure, wherein the RRC message includes an indicator for indicating the failure report.

6. The method of claim 3, comprising the wireless device sending the failure report on one or more resources of an uplink control channel of the second transmission beam, wherein the one or more resources are configured for indicating the failure report.

7. The method of claim 1, comprising the wireless device reporting additional information associated with the failure report, wherein the additional information comprises at least one of: channel occupancy, LBT statistics, one or more radio quality indicators, one or more quality of service indicators, one or more buffer status reports, and one or more power headroom reports.

8. The method of claim 1, comprising the wireless device:
sending the failure report in response to the number of detected LBT failures reaching a threshold value;
monitoring the number of detected LBT failures by a counter;
starting a timer upon detecting an LBT failure;
sending the failure report in response to the counter reaching the threshold value; and
resetting the counter to zero, upon expiry of the timer before the counter reaches the threshold value, the wireless device.

9. A method of controlling wireless transmissions in a wireless communication system, the method comprising:
on a single serving transmission beam selected from a plurality of transmission beams, an access node receiving listen before talk (LBT) based uplink wireless transmissions from a wireless device;
the access node receiving a failure report from the wireless device, the failure report indicating a number of detected LBT failures on the single serving transmission beam exceeding a predetermined threshold for the single serving transmission beam; and
based on the failure report, the access node controlling switching of the wireless device to a new serving transmission beam.

10. The method of claim 9, wherein the failure report comprises an identifier of the serving transmission beam and identifies one or more candidate transmission beams for selection of the new serving transmission beam.

11. The method of claim 9, comprising in response to the failure report, the access node initiating switching of the wireless device to a new serving transmission beam utilizing frequency resources that correspond to frequency resources used on the serving transmission beam.

12. The method of claim 9, comprising in response to the failure report, the access node initiating switching of the wireless device to a new serving transmission beam and to frequency resources that differ from the frequency resources used on the serving transmission beam.

13. The method of claim 12, wherein the frequency resources on a new transmission beam and the frequency resources on the transmission beam differ with respect to utilized frequency resources within a same bandwidth part (BWP).

14. The method of claim 13, wherein the frequency resources on the new transmission beam and the frequency resources on the transmission beam differ with respect to the utilized BWP.

15. The method of claim 9, comprising in response to the failure report, the access node initiating switching of the wireless device to another cell of the wireless communication system.

16. A wireless device for a wireless communication system, the wireless device including:
processing circuitry and a memory, the memory containing instructions executable by the processor whereby the wireless device is configured to:
on a single serving transmission beam selected from a plurality of transmission beams, send listen before talk (LBT) based uplink wireless transmissions to an access node;
detect LBT failures on the single serving transmission beam; and
based on a number of the detected LBT failures on the single serving transmission beam exceeding a predetermined threshold for the beam, send a failure report to the access node, the failure report indicating the detected LBT failures on the single serving transmission beam.

17. The wireless device of claim 16, further configured to:
select a second transmission beam of the plurality of transmission beams;
send the failure report on the second transmission beam;
perform a random access procedure on the second transmission beam; and
the wireless device sending the failure report by at least one message of the random access procedure.

18. The wireless device of claim 16, further configured to:
send the failure report in response to the number of detected LBT failures reaching a threshold value;
monitor the number of detected LBT failures by a counter;
start a timer upon detecting an LBT failure;
send the failure report in response to the counter reaching the threshold value; and
reset the counter to zero, upon expiry of the timer before the counter reaches the threshold value, the wireless device.

19. An access node for a wireless communication system, the access node including:

processing circuitry and a memory, the memory containing instructions executable by the processor whereby the access node wireless device is configured to:

on a single serving transmission beam selected from a plurality of transmission beams, receive listen before talk (LBT) based uplink wireless transmissions from a wireless device;

receive a failure report from the wireless device, the failure report indicating a number of detected LBT failures on the single serving transmission beam exceeding a predetermined threshold for the single serving transmission beam; and based on the failure report, control switching of the wireless device to a new serving transmission beam.

20. The access node of claim 19, further configured to in response to the failure report, the access node initiating switching of the wireless device to a new serving transmission beam utilizing frequency resources that correspond to frequency resources used on the serving transmission beam.

* * * * *